United States Patent [19]

Dang et al.

[11] Patent Number: 5,757,594
[45] Date of Patent: May 26, 1998

[54] PLUGABLE MEDIA STACKLOADING SYSTEM

[75] Inventors: Chi-Hung Dang; Kamal Emile Dimitri; John Edward Kulakowski; Rodney Jerome Means, all of Tucson, Ariz.

[73] Assignee: International Business Machines Corporation, Armonk, N.Y.

[21] Appl. No.: 577,948

[22] Filed: Dec. 22, 1995

Related U.S. Application Data

[63] Continuation-in-part of Ser. No. 340,517, Nov. 16, 1994, abandoned.

[51] Int. Cl.$^6$ .......................... G11B 17/04; G11B 17/22
[52] U.S. Cl. ............................. 360/191; 360/36
[58] Field of Search ........................... 360/92; 369/36, 369/191

[56] References Cited

U.S. PATENT DOCUMENTS

| | | | |
|---|---|---|---|
| 4,878,137 | 10/1989 | Yamashita et al. | 369/36 |
| 5,014,255 | 5/1991 | Wanger et al. | 369/36 |
| 5,089,920 | 2/1992 | Bryer et al. | 360/92 |
| 5,123,000 | 6/1992 | Fitzgerald et al. | 369/36 |
| 5,153,862 | 10/1992 | Taylor et al. | 369/36 |
| 5,182,686 | 1/1993 | Lindenmeyer | 360/92 |
| 5,264,974 | 11/1993 | Campbell et al. | 360/92 |

FOREIGN PATENT DOCUMENTS

| | | |
|---|---|---|
| 55-122263 | 9/1980 | Japan . |
| 3-224168 | 10/1991 | Japan . |
| WO 91/04930 | 4/1991 | WIPO . |

*Primary Examiner*—Robert S. Tupper
*Assistant Examiner*—David D. Davis
*Attorney, Agent, or Firm*—Baker Maxham Jester & Meador

[57] ABSTRACT

A media stackloader processes removable data storage media such as optical disks, magnetic diskettes, or tape media. The stackloader removably couples to a storage drive, such as by plugging into a slot of the host computer. The stackloader has a plug portion integral with a housing portion, the plug portion plugging into the host computer and the housing portion housing a magazine containing the removable media. The stackloader includes a device for moving the magazine vertically within the housing to align selected cartridges with an opening in one of the drives of the personal computer. After the cartridge is aligned, a device is employed for moving the cartridge horizontally into the drive for processing and, after processing, for withdrawing the cartridge from the drive back into the magazine. A locking mechanism selectively locks and unlocks the cartridges to prevent improper removal of cartridges from the magazine. Another aspect of the invention includes a method for operating a media stackloader, supporting operations needed to add new cartridges to a magazine, remove existing cartridges, read data from a cartridge, write data to a cartridge, audit the status of cartridges in a magazine, and aid the operator in exchanging mounted magazines and cartridges with different, un-mounted magazines or cartridges.

16 Claims, 18 Drawing Sheets

PLUGABLE MEDIA STACKLOADING SYSTEM

CROSS-REFERENCE TO RELATED APPLICATIONS

This application is a continuation-in-part of U.S. application No. 08/340,517, now abandoned, entitled "Pluggable Media Stackloader for Personal Computer," which was filed in the U.S. Patent & Trademark Office on Nov. 16, 1994.

BACKGROUND OF THE INVENTION

1. Field of the Invention

The present invention relates to the exchange of data between computers and removable digital data storage media such as optical disks. More particularly, the invention concerns a pluggable media stackloader apparatus that can be plugged into a slot of a host computer for processing media in a drive of the host computer. Another aspect of the invention concerns a process for operating the stackloader and the host computer to manage, maintain, and utilize storage media of the stackloader.

2. Description of the Related Art

To store large amounts of data under conditions guaranteeing automatic, reasonably speedy access to data storage media, media libraries have been developed. These libraries store the media in magazines and employ transport mechanisms to move media instances between magazines and media drives.

Magazines containing media, such as cartridges which contain optical or magnetic disks, are presently processed by large and complex transport systems. An operator inserts a magazine into a receptacle which positions cartridges in the magazine for processing. A picker transports a selected cartridge from the magazine to a drive where a disk contained in the cartridge is processed by writing and reading data on the disk. After processing, the cartridge is transported to the magazine and the picker stands ready to transport another cartridge. The picker for such a transport system is somewhat complex. The picker grabs and withdraws the cartridge from the magazine in an X direction, transports it in a Z direction and inserts the cartridge in the drive in the X direction. Normally the picker includes a receptacle through which the cartridge is translated between the magazine and the drive without any flipping of the cartridge.

There has been a long standing and strong felt need in small, low-end computer systems for a media storage and transport system that provides a magazine mounted library capability without requiring additional drive or a standalone library. What has been described hereinabove is a large system employed by companies or other entities which have a large volume of data to be processed. Such a system is too large and too expensive for a small system which processes data on a personal computer. It is obvious that the scheme of the large system is not applicable for processing magazine mounted media by a personal computer. To be compatible with a personal computer the apparatus must be small, easy to use and low in cost.

In small computer systems, stackloaders have been developed to provide library-like services for media such as tape or floppy disks. Stackloaders typically store a plurality of medium instances (such as tape cassettes) in a vertical array (a "stack") by means of a frame, which may be plugged into a medium drive receptacle. A transport mechanism selects a medium instance, extracts it from the stack, loads it into the drive, and later extracts it from the drive and returns it to the stack.

To date, stackloaders for small computer systems have been particularly adapted for a single use. Relatedly, no stackloader is known which can either plug into a drive receptacle or operate on a standalone basis. Further, the existing stackloaders are not capable of accessing medium instances in adjacent receptacles. Last, known stackloaders are designed for use with particular medium configurations and cannot adapt to the different distances and dimensions of other configurations. Thus, there is a manifest need for a stackloader that can interface with a small computer system by anchoring in a drive receptacle, yet which can store medium instances and operate outside of the drive receptacle and access medium instances in adjacent drive receptacles. The need also embraces the as-yet unsatisfied requirement that the stackloader be adaptively reconfigurable to the dimensions and distances of different medium configurations.

SUMMARY OF THE INVENTION

The present invention provides a novel transport system for processing a batch of cartridges in a storage drive, such as a drive of a personal computer. The transport system, which is referred to as a plugable stackloader (or a plugable autochanger), includes a housing for accepting a magazine of cartridges and a plug which fixedly extends from the housing. The plug plugs into a slot or half high slot in the front face of the computer with the housing positioned opposite a drive for processing the cartridges. A vertical transport device vertically positions the magazine within the housing at selected vertical positions which align a selected cartridge with the drive. When the selected cartridge is aligned, a horizontal picker device moves the cartridge into the drive for processing and returns the cartridge to the magazine after processing.

The vertical transport device and the horizontal picker device are controlled by an autochanger controller which may be located inside the plug portion of the stackloader. The autochanger controller is connected to a motherboard in the personal computer via a Small Computer System Interface ("SCSI"). An operator can control the operation of the stackloader by sending commands to the computer via a keyboard. Selected data can be retrieved, recorded or sorted. If the plugable stackloader is not involved in an operation, an operator can add or remove cartridges from the magazine.

Provision is made for indicating the type of magazine and media, whether the magazine is at a home position and whether a cartridge is in the drive. The vertical movement device and the horizontal movement device employ incremental movements which can be counted to various levels so that the stackloader can be adapted to process various types of media. In a preferred embodiment, the drive receives a major portion of the cartridge while a small portion of the cartridges remains outside the drive in engagement with the horizontal picker device. This arrangement enables a very simple horizontal picker device. A major difference between the present invention and large magazine transport systems is that in the present invention the magazine is transported vertically.

Advantageously, the stackloader includes a locking mechanism, such as a solenoid, to selectively prevent removal of cartridges during certain sensitive operations, such as when a cartridge is being transported within the stackloader. Also, an indicator strip is provided adjacent the cartridge receptacles, to aid the operator in locating a cartridge receptacle for removal or addition of a cartridge, by individually activating the indicator proximate the appropriate receptacle. Also, in a multiple stackloader system, assistance may be provided to the operator in adding or removing a magazine by illuminating all indicators of the indicator strip of the stackloader where the magazine exchange is to take place. Operator interaction is enhanced by use of an access panel mounted near the stackloader, to receive input from the operator and provide messages to the him/her.

Another important aspect of the invention includes a process for operating a pluggable stackloader such as the embodiment described herein. Operational sequences are provided for adding a new cartridge to a magazine, removing a cartridge, auditing the status of the cartridges, reading data from a cartridge, and writing data to a cartridge. Moreover, a sequence is provided that aids the operator in exchanging cartridges with a magazine mounted to the stackloader, or in exchanging the magazine itself with a different magazine.

The invention provides a number of distinct advantages to its uses. For example, the stackloader implementation of the invention allows the insertion or removal of a magazine or cartridge using a set of sensors and interlocks such that a magazine or cartridge can be inserted or removed from the stackloader free from danger to the operator or damage to the media or machine. The invention also provides a number of other benefits, as shown below.

DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DESCRIPTION OF THE PREFERRED EMBODIMENTS

HARDWARE COMPONENTS & INTERCONNECTIONS

Figure 1:
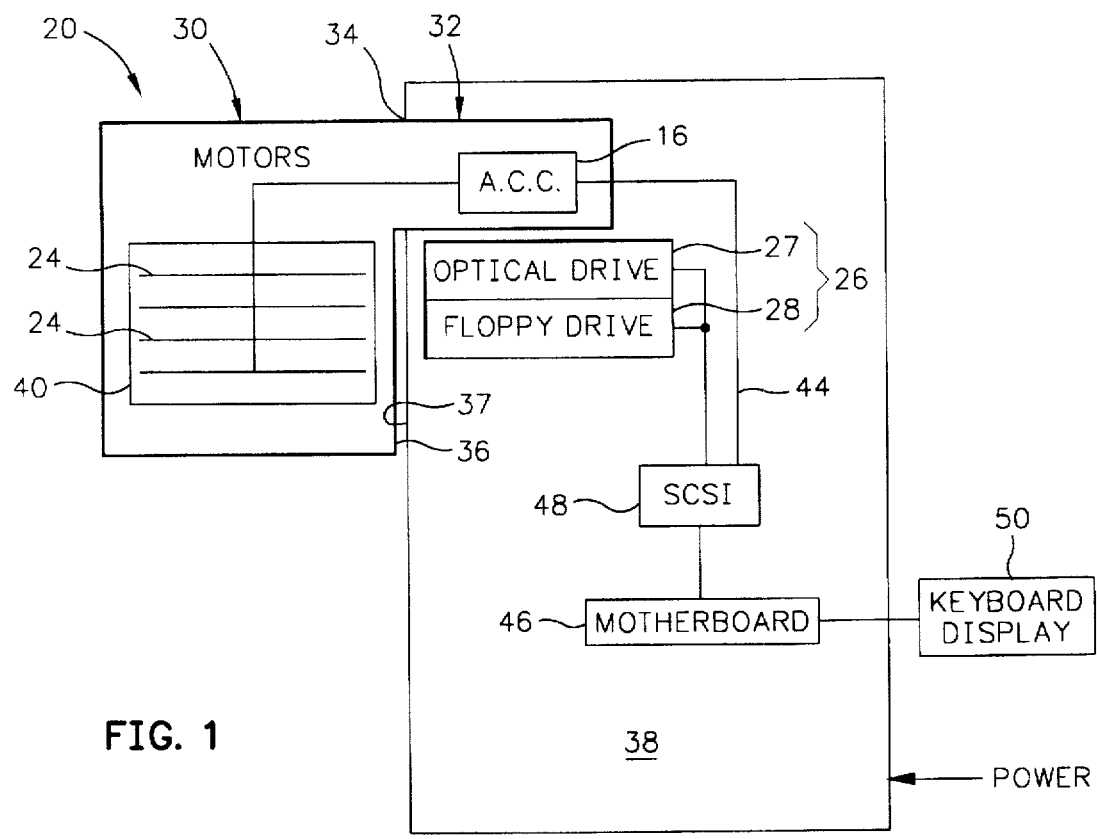
FIG. 1 is a side elevational schematic illustration of the plugable stackloader plugged into a personal computer.
Figure 1A:
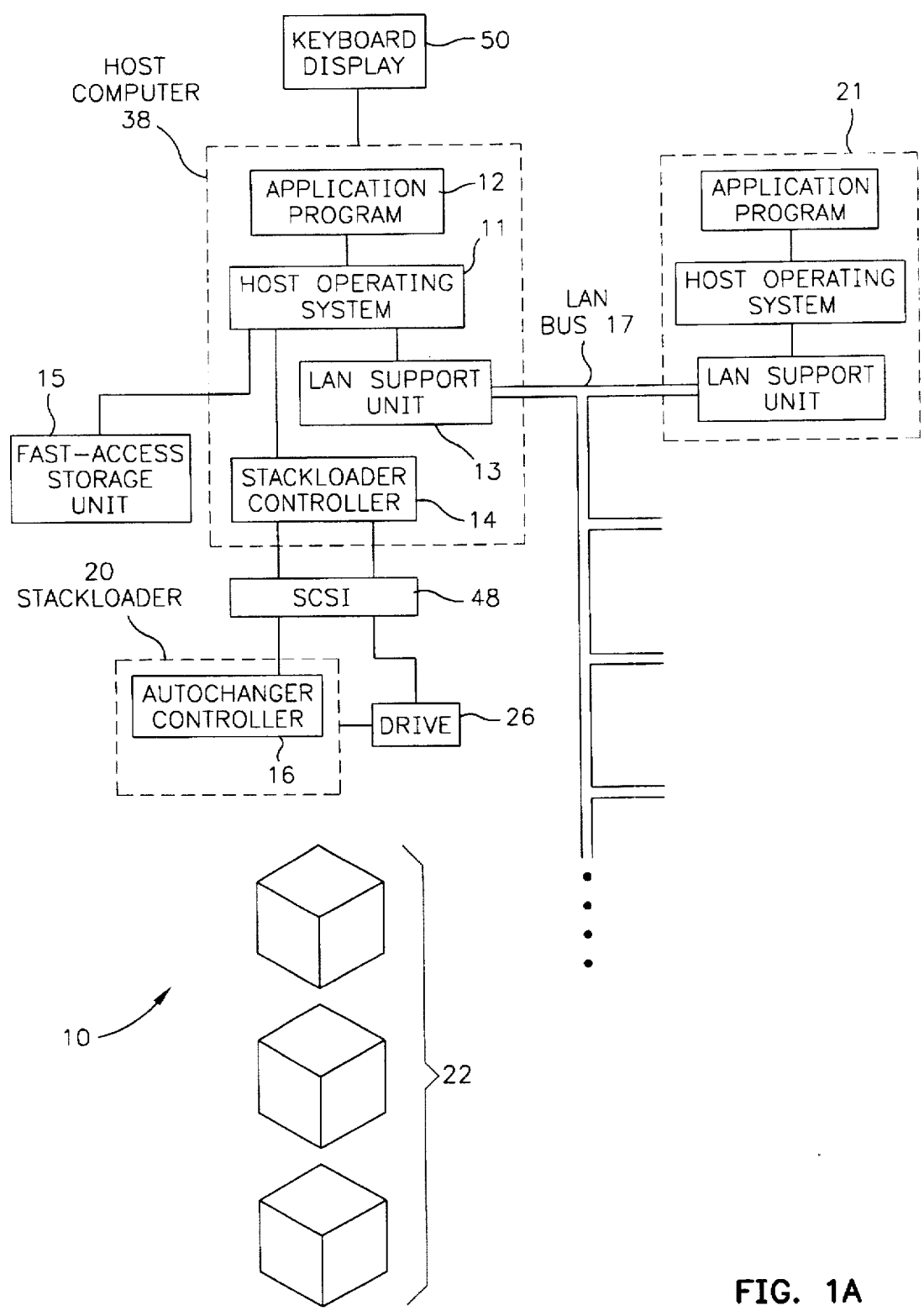
FIG. 1A is a block diagram generally depicting an illustrative system of various electronic components and software modules, as well as the electrical and functional interconnections therebetween.

FIG. 1A generally depicts an illustrative system 10 in accordance with the present invention, including various electronic components and software modules and the electrical and functional interconnections therebetween. The system 10 includes a host computer 38, which comprises a digital data processing machine such as a workstation, mainframe computer, personal computer, or other appropriate platform. As described in greater detail below, the host computer 38 is coupled to a stackloader 20, which selectively loads and accesses cartridges contained in a magazine coupled to the stackloader.

The host computer 38 is also coupled to a keyboard display 50, to exchange data between the host computer 38 and a human operator (not shown). In this respect, the keyboard display 50 may include (1) a video monitor or other apparatus to visually convey human-readable information to the operator from the host computer 38, and (2) a keyboard or other data entry device to convey machine-readable information from the operator to the host computer 38. However, the keyboard display 50 may alternatively comprise a variety of other operator interface devices.

The host computer 38 has a number of sub-components. Centrally, the host computer 38 includes a host operating system 11, which may be a software module such as OS/2, VMS, or another suitable operating system. The operating system 11 functionally interconnects to an application program 12, a local area network ("LAN") support unit 13, a stackloader controller 14, and a fast-access storage unit 15. If desired, the components 11–14 may be implemented by a single processing unit, such as the CPU (not shown) of the host computer 38. As an alternative, the components 11–14 may be implemented by one or more separate hardware components.

The application program 12 comprises a program executed by the host computer 38 to perform some complex task requested by the operator via the keyboard display 50. To most thoroughly illustrate the features of the present invention, the application program 12 is discussed herein as being a program that requires access to data accessible by the stackloader 20. Such an application program may comprise a database program, for example.

The LAN support unit 13, an optional feature, interfaces with a LAN bus 17 that ties the host computer 38 to other remotely located hosts, such as the remote host 21, also participating in the LAN.

The fast-access storage unit 15 comprises a data storage device, such as a Direct Access Storage Device ("DASD"), to quickly exchange data between the host computer 38 and one or more data storage media (not shown) included in the storage unit 15. For example, the storage unit 15 may comprise a magnetic "hard drive".

The stackloader controller 14 assists in directing the stackloader 20 to store and retrieve data pursuant to the invention. The construction of the stackloader 20 is described in greater detail below. The stackloader controller 14 may be located remotely from the stackloader 20 itself, whereas an autochanger controller 16 may be provided locally aboard the stackloader 20. Alternatively, the controllers 14 and 16 may incorporated into a single unit.

As illustrated below, some of the many functions of the stackloader controller 14 are to maintain an inventory that lists all magazines and cartridges, evaluate requirements for delivery of magazines and cartridges to the stackloader 20, and oversee the exchange of data between the host computer 38 and the media via the drive 26, e.g. reading and writing. In this respect, the stackloader controller 14 may be considered to include (1) a device driver (not shown) that communicates with the drives and the library to access the media and move the cartridges (2) a volume and file driver (not shown) that interfaces with the device driver to read and write directory information and data, (3) a library inventory driver that accesses the inventory information and interfaces with a library driver to cause the requested volume to be fetched and mounted in the library, and also facilitates communications between the volumes contained in the library and the applications and operator.

The autochanger controller 16 communicates with the stackloader controller 14 via an interface, described for illustrative purposes as an SCSI 48. Operation of an SCSI, including optical disk drive SCSI commands and autochanger SCSI commands, is described in a published ANSI Standard entitled "Small Computer System Interface—2, X3T9.2/86-109". Although an SCSI is preferred, a variety of other interfaces may be used instead. A drive 26 communicates with the stackloader controller 14 via the SCSI 48, or via a separate interface (not shown) if desired. The drive 26 preferably comprises one or more data storage drives for reading and writing data to storage media such as optical disks and/or magnetic disks.

As explained in greater detail below, the stackloader 20 serves to manage the physical transfer of data storage media between a multi-media storage structure (such as a magazine) and the data storage drive 26. In this regard, the system 10 may include multiple magazines 22, which may be individually coupled to the stackloader 20 to make the cartridges of these magazines accessible by the stackloader 20. Machinery (described below) of the stackloader 20 selectively loads media from the stackloader 20 into the data storage drive 26, permitting the drive 26 to read and write data from/to the loaded media.

More particularly, the stackloader 20 may advantageously be "plugged into" a full height or "half high" 5¼ inch slot in the face of a personal computer that has one or more storage drives in one or more slots therebelow. As described below, the stackloader 20 employs a vertical moving device to move a magazine up and down within the stackloader so that an item of media can be aligned with an opening in a selected drive(s). A horizontal moving device moves media items into and out of the drive(s).

FIG. 1 illustrates a specific example of the stackloader 20, shown plugged into the computer 38 for processing media 24 in the drive 26. As mentioned above, the drive 26 may comprise an optical drive 27 or a floppy drive 28, for example. The stackloader includes a housing 30 and a plug 32, the plug 32 being fixedly attached to the housing 30 and co-extensive along its sides and top with the housing which will be clear from the drawings described hereinafter. The plug 32 is snugly received by a slot, such a 5¼ inch slot 34 of the computer so that a rear face 36 of the housing is facing and adjacent a front face 37 of the computer 38.

The media 24, which will be referred to hereinafter as cartridges, are mounted in receptacles in a magazine 40 so that a cartridge can slide from the magazine into a drive when the cartridge is aligned therewith. Although the preferred embodiment contemplates each cartridge 2–4 comprising a portable container housing a single optical disk, the terms "media" and "cartridges" used herein also include optical tape, magnetic diskettes, magnetic tape, or any other removable media.

Provision is made for vertically moving the magazine 40 for aligning a selected cartridge with a drive and provision is made for horizontally moving the aligned cartridge into and out of the drive for processing which will be explained in more detail hereinafter. One aim of the invention is to process a mini-library of cartridges with a typical personal computer upon command.

The autochanger controller ("A.C.C.") 16 is located inside the plug 32 and is connected by a cable 44 to the stackloader controller 14 via the SCSI 48. In the illustrated embodiment, the stackloader controller 14 is embodied in a motherboard 46 of the computer 38. The details of these components will be described in more detail hereinafter. The user keyboard display 50 may be connected to the motherboard 46 as illustrated, and employed by an operator to send commands via the computer motherboard 46 and the SCSI 48 to the stackloader 20 for vertically moving the magazine 40 and horizontally moving the cartridges 24. The SCSI interface may comprise a circuit board commonly used within most personal computers and the autochanger controller 16 may comprise a standard microprocessor for media libraries. The SCSI 48 and the autochanger controller 16 preferably employ the ANSI standard command set for media libraries.

Figure 2:
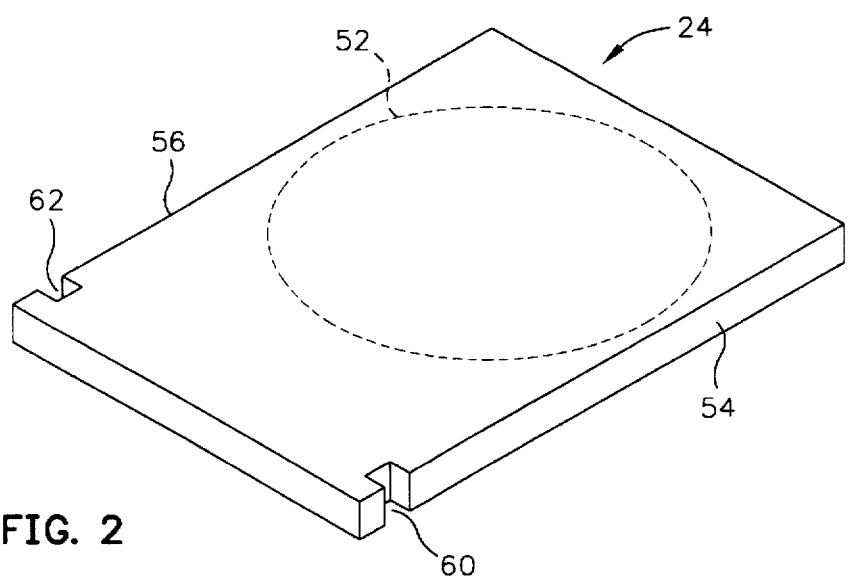
FIG. 2 is a schematic illustration of a cartridge which has a pair of notches.

FIG. 2 is a schematic illustration of a preferred cartridge 24 for containing a medium such as an optical disk 52. The cartridge has a pair of parallel side edges 54 and 56 which have oppositely located notches 60 and 62, respectively. While the invention is primarily described for optical disks, it should be understood that the invention could be employed for magnetic media.

Figure 3:
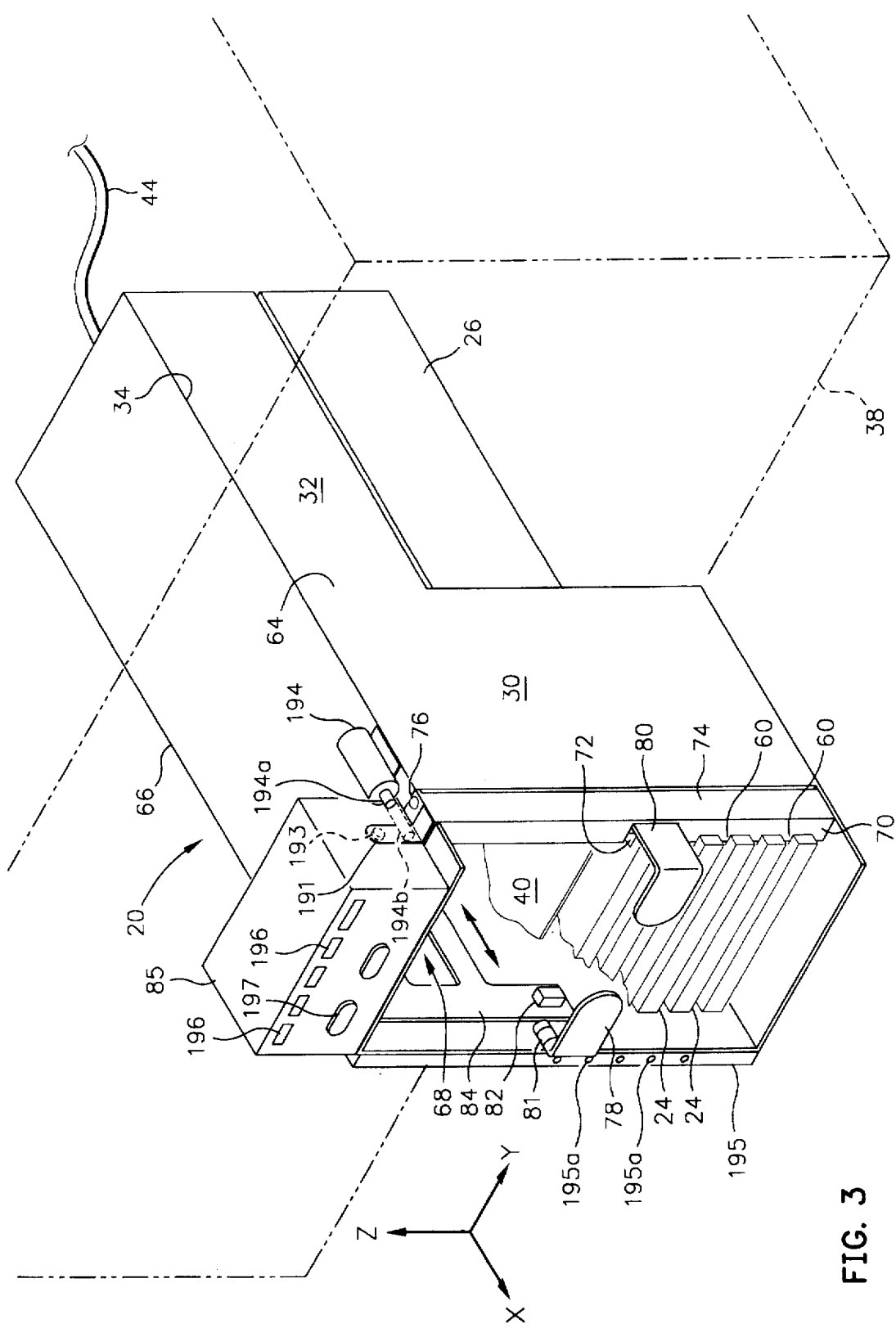
FIG. 3 is an isometric view of the plugable stackloader plugged into a personal computer with a cartridge locking device shown in the locked position.

In FIG. 3 the plug 32 of the stackloader 20 is shown plugged into the slot 34 of the computer as described hereinabove. The stackloader 20 has right and left cover plates 64 and 66 which cover support plates, to be described hereinafter, and which provide right and left vertical sides of the housing 30 and the plug 32. A rear portion of the magazine 40 and rear portions of the cartridges 24 are seen adjacent a rear opening 68 of the stackloader housing. The right and left notches 60 and 62 (FIG. 2) of the cartridges are vertically aligned on right and left sides, respectively, of the housing 30. A rail 70 is received by the right notches 60 for locking the cartridges from horizontal movement along an x-axis as the magazine is moved vertically along a z-axis. There is one exception to this locking function. The rail 70 is provided with a notch 72 which is aligned with an opening in the drive 26 so that when the magazine 40 is vertically positioned to align a selected cartridge with the opening of the drive the cartridge can be moved horizontally into the drive for processing. In order to unlock the cartridges for removal and replacement, the rail 70 is made integral with a flange 74, which is pivoted to the housing at 76, for allowing the rail 70 to swing outwardly from the notches as illustrated in FIG. 4.

Right and left transversely extending tabs 78 and 80 are also aligned with the opening in the drive to prevent an operator from inserting a cartridge into an empty receptacle which is reserved for a cartridge which is being processed in the drive. The operator can remove and replace cartridges in receptacles of the magazine either above or below these tabs 78 and 80. The tab 78 may be pivoted at 81 and the tab 80 may be connected to the rail 70 so that they can be swung out of the way making a passageway for inserting and removing magazines from the housing. With the magazine removed the operator can put a cartridge directly into a drive or take a cartridge out of a drive.

A portion of the magazine and cartridges are cut away in FIG. 3 to show a engagement block 82 which is received in the vertical column of left notches 62 of the cartridges as the cartridges move up and down within the magazine 40. The engagement block 82 is horizontally aligned with an opening in the drive 26 so that when a selected cartridge is aligned with the opening in the drive, the detent can be moved horizontally for moving the cartridge into the drive 26 for processing. The engagement block 82 is connected to a horizontal movement device, a portion of which is shown at 84 and which will be described in more detail hereinafter.

Figure 4:
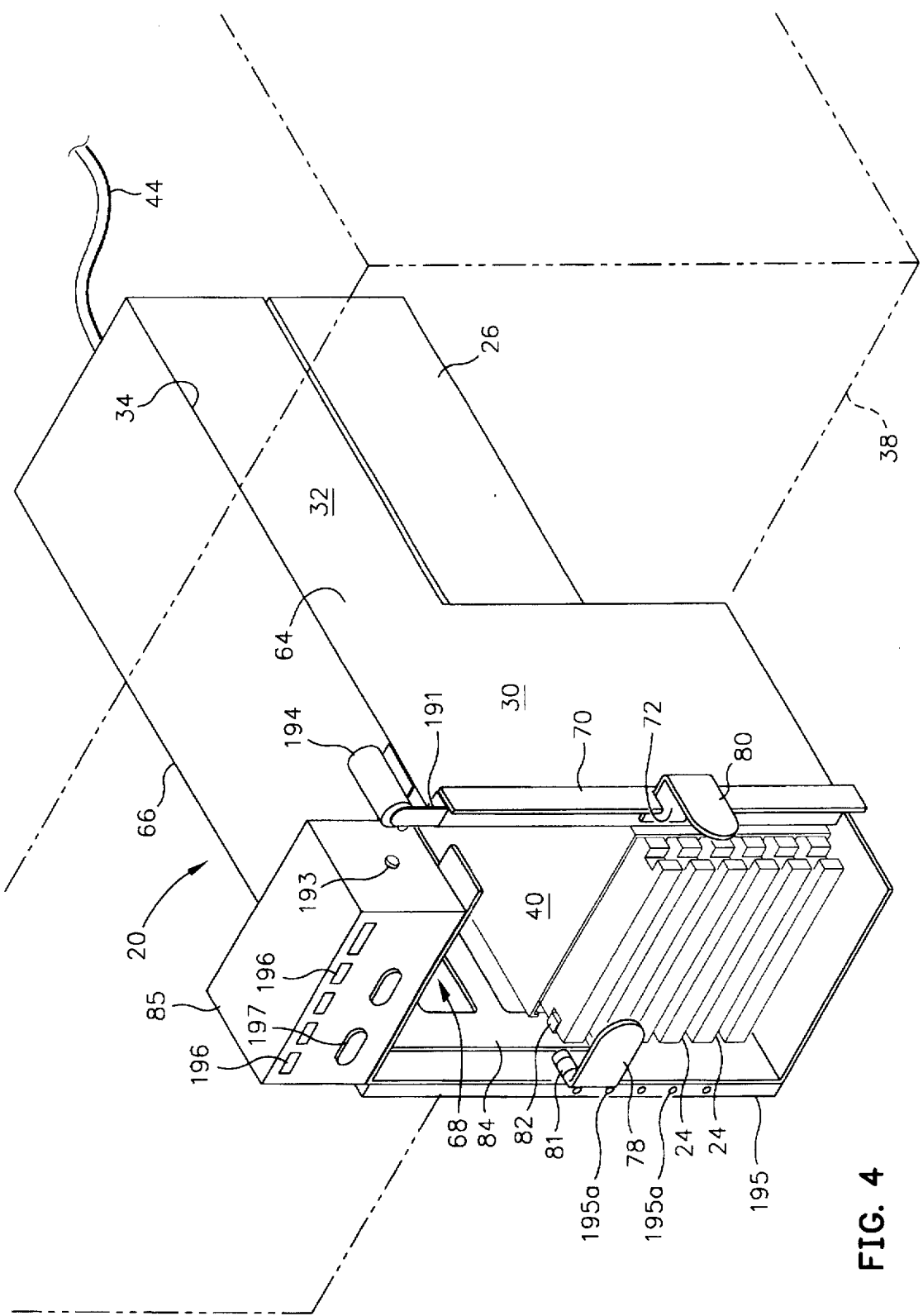
FIG. 4 is the same as FIG. 3 except the cartridge locking device is shown in an unlocked position.

As shown in FIGS. 3–4, the stackloader 20 also includes a locking solenoid 194 (also called a "door lock solenoid"), a locking tab 191, and a ready sensor 193. The locking solenoid 194 comprises an electrically-operated solenoid positioned near the locking tab 191, the tab 191 being firmly connected to, or integral with, the flange 74. When the stackloader is operating, the locking solenoid 194 is used in conjunction with the rail 70 (as shown in FIG. 3) for keeping the rail in a locked position in the notches 60 of the cartridges 24.

The locking solenoid 194 is electrically connected to a current driver of the autochanger controller 16, as described below; when the locking solenoid 194 receives an activating electrical signal from its current driver, a locking pin extends from its recessed position 194a to its locking position 194b and prevents the locking tab 191 from pivoting outward. In this position, the flange 74 cannot pivot outward to expose the cartridges 24. Accordingly, the cartridges 24 are locked in place when the locking solenoid 194 is activated.

The ready sensor 193 comprises a mechanical, opto-electric, or another appropriate device to sense whether the flange 74 is completely closed. In the illustrated embodiment, the ready sensor 193 comprises a resilient button that is depressed and thus activated when the locking tab 191 pivots against the sensor 193.

Another component of the stackloader 20 is an indicator strip 195. The indicator strip 195 highlights one or more cartridge receptacles in the magazine by providing a visible indication next to the receptacles. In accordance with the invention, this is performed to indicate when it is safe or desirable to remove cartridges from the highlighted receptacles, or to insert cartridges into the highlighted receptacles, for instance. In this respect, the indicator strip 195 may comprise a long, narrow strip of LEDs 195a (as illustrated), or another suitable selectively activated visual indicator(s).

The indicators 195a are preferably spaced at a sufficiently small interval to accommodate magazines containing many small media therein, and also to accommodate magazines containing a lesser number of larger sized media. In addition to the functions described above, multiple indicator strips 195 may be employed in a data storage system with multiple stackloaders, where all indicators 195a of a single strip 195 are illuminated simultaneously to direct an operator's attention to a particular stackloader to conduct magazine exchange therein.

Figure 4A:
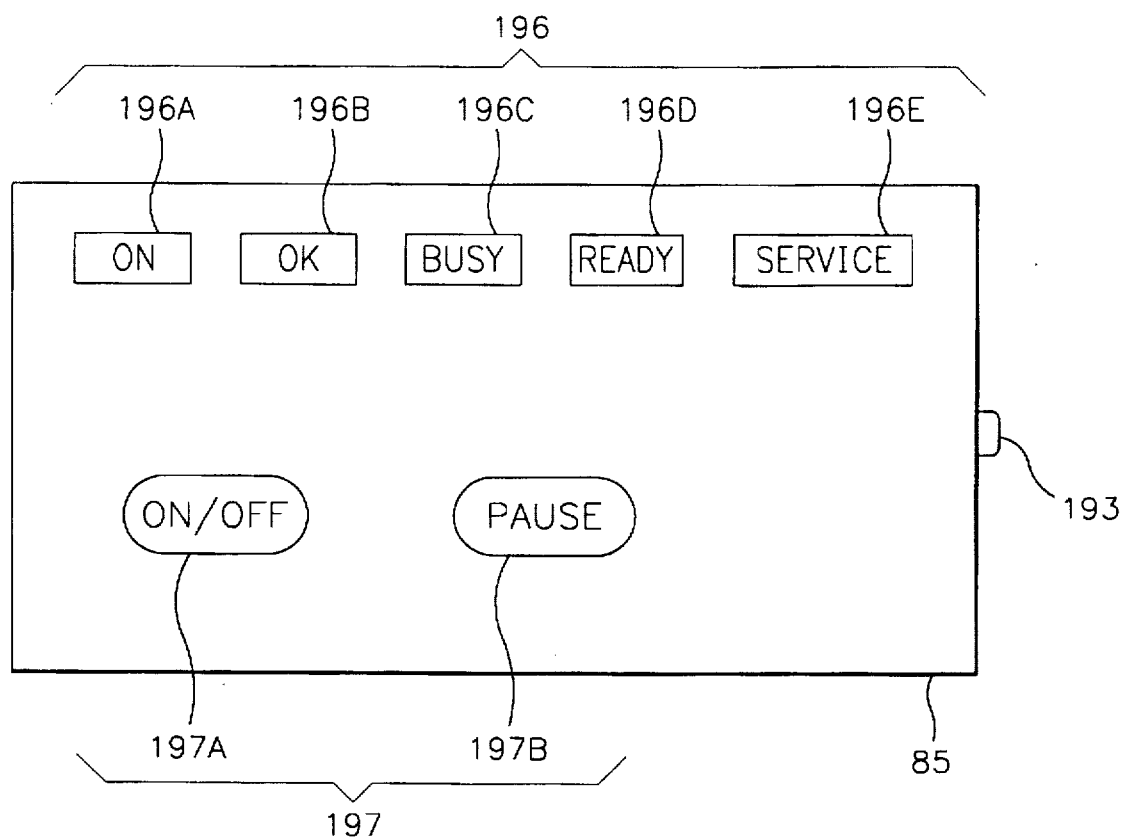
FIG. 4A is an enlarged front face view of the operator panel shown in FIGS. 3–4.

Referring to FIGS. 3–4 and 4A, the stackloader 20 also includes an operator panel 85 to exchange data between the operator (not shown) and the stackloader 20. More particularly, the operator panel 85 includes (1) visual indicators 196 to visually convey human-readable information to the operator from the stackloader 20, and (2) switches 197, such as push-buttons, to convey machine-readable information from the operator to the stackloader 20. The visual indicators 196 preferably comprise light-emitting diodes ("LEDs"), or another suitable visual display, to provide various items of information to the operator.

In the illustrated example, the indicators 196 include a power-on ("ON") indicator 196a, an "OK" indicator 196b, a "BUSY" indicator 196c, a "READY" indicator 196d, and a "SERVICE" indicator 196e. The "OK" indicator 196b shows whether it is okay to insert or remove a cartridge or a magazine, and the service indicator 196e shows whether the stackloader needs service, such as when a cartridge is stuck. The "BUSY" indicator 196c signifies that a cartridge 24 is being processed. The "READY" indicator 196d denotes that the rail 70 is locked into the cartridges 24 and that the stackloader is ready for operation. More specifically, the READY indicator 196d is illuminated when both of the following conditions exist: (1) the ready sensor 193 is activated (i.e., depressed as discussed above), and (2) the locking solenoid 194 is activated (i.e., the locking pin is in the locking position 194b).

The switches 197 preferably include switches or other user entry devices marked to provide an "ON/OFF" switch 197a and a "PAUSE" switch 197b. The PAUSE switch 197b allows an operator to stop the operation of the stackloader so the operator can insert or remove a cartridge with respect to the magazine. The switches 197, the locking solenoid 194, and the visual indicators 196 may be operated through the autochanger controller logic 43 shown in FIG. 10.

Figure 5:
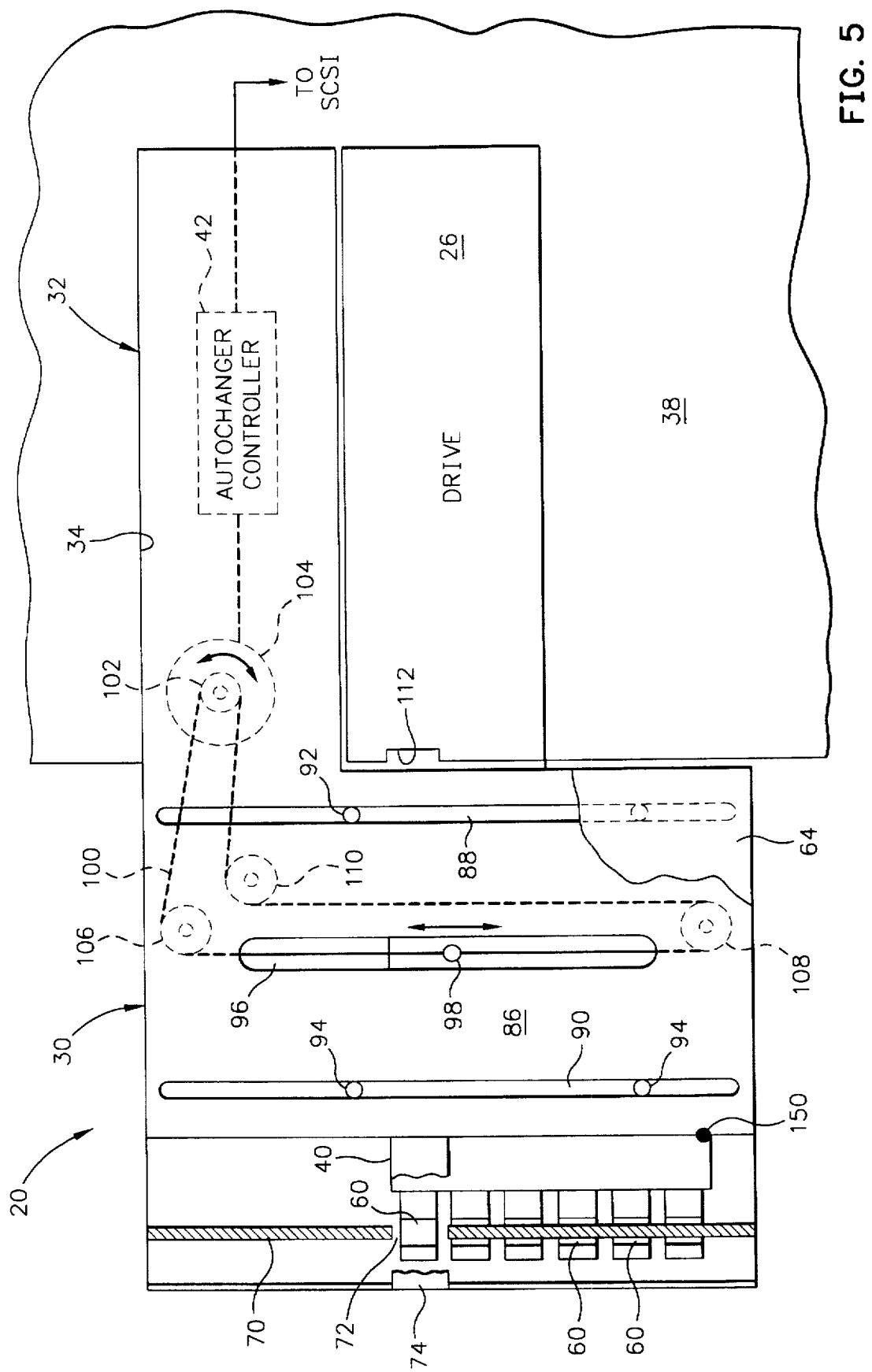
FIG. 5 is a side elevational schematic illustration of a first side of the plugable stackloader plugged in a personal computer with a side cover removed.

FIG. 5 shows a right side of the stackloader with the plug 32 plugged into the slot 34 of the computer with a majority of the right cover plate removed except for a small portion shown at 64. A right support plate 86 is vertically mounted in the housing 30 and the plug 32 for supporting components which move the magazine 40 vertically within the housing 30. The support plate 86 has front and rear vertical slots 88 and 90 which are parallel with respect to one another. Mounted on the magazine 40 or a tray (not shown) for supporting the magazine are front and rear sets of rollers 92 and 94 which ride up and down in the vertical slots 88 and 90, respectively, as the magazine 40 is moved up and down by a vertical movement device to be described in detail hereinafter. The support plate 86 has an intermediate vertical slot 96 between the vertical slots 88 and 90. A pin 98 is fixed to a belt 100 which connects the pin 98 to a pulley 102 of an incremental motor 104 via top and bottom pulleys 106 and 108, which align the belt along the slot 96, and an intermediate pulley 110 which returns the belt to the pulley 102. The pulleys 106, 108, and 110 and the motor 104 are mounted to the support plate 86. The motor 104 is operatably connected to the autochanger controller 42 and is controlled thereby which will be described in more detail hereinafter. FIG. 5 also illustrates the rail 70 recessed in the vertical column of notches 60, the notch 72 which is aligned with an opening 112 in the drive 26, and the right tab 74 which is also aligned with the opening 112 of the drive.

Figure 6:
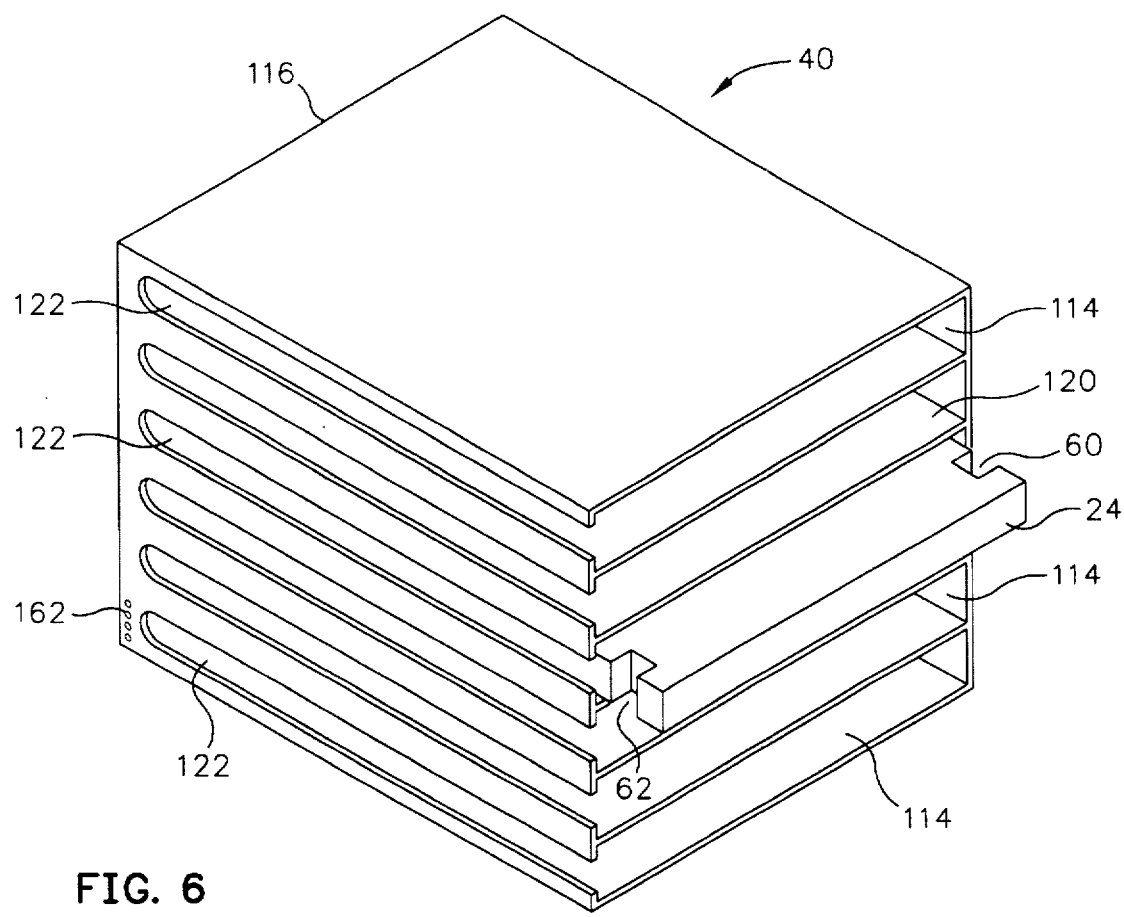
FIG. 6 is a second side view of the magazine out of the housing of the stackloader with one cartridge shown in place.

FIG. 6 is an enlarged illustration of the magazine 40 shown out of the housing of the stackloader with one disk 24 shown therein for explanatory purposes. The magazine 40 has a plurality of horizontally extending receptacles 114, each receptacle being capable of slidably supporting a respective cartridge 24. Each receptacle has front and rear open ends 116 and 120 so that an operator can insert or remove cartridges through the openings 120 and the cartridges can be inserted into the opening of the drive 26 (see FIG. 5) through the front opening 116. As can be seen from FIG. 6, the cartridge 24 extends rearwardly from the rear opening 120 so that the notches 60 and 62 can form vertical columns of notches which are exposed for processing, the right column of notches being clearly seen at 60 in FIG. 5. The right notch 60 receives the rail 70, as seen in FIG. 5, for locking purposes, as explained hereinabove, and the left notch 62 is employed with a horizontal picker device which will be explained in more detail hereinbelow. Each receptacle 114 has a respective horizontal slot 122 which is also employed by the horizontal picker device. The magazine 40 is exemplary and it should be understood that it can be configured in different sizes for different sizes of media.

Figure 7:
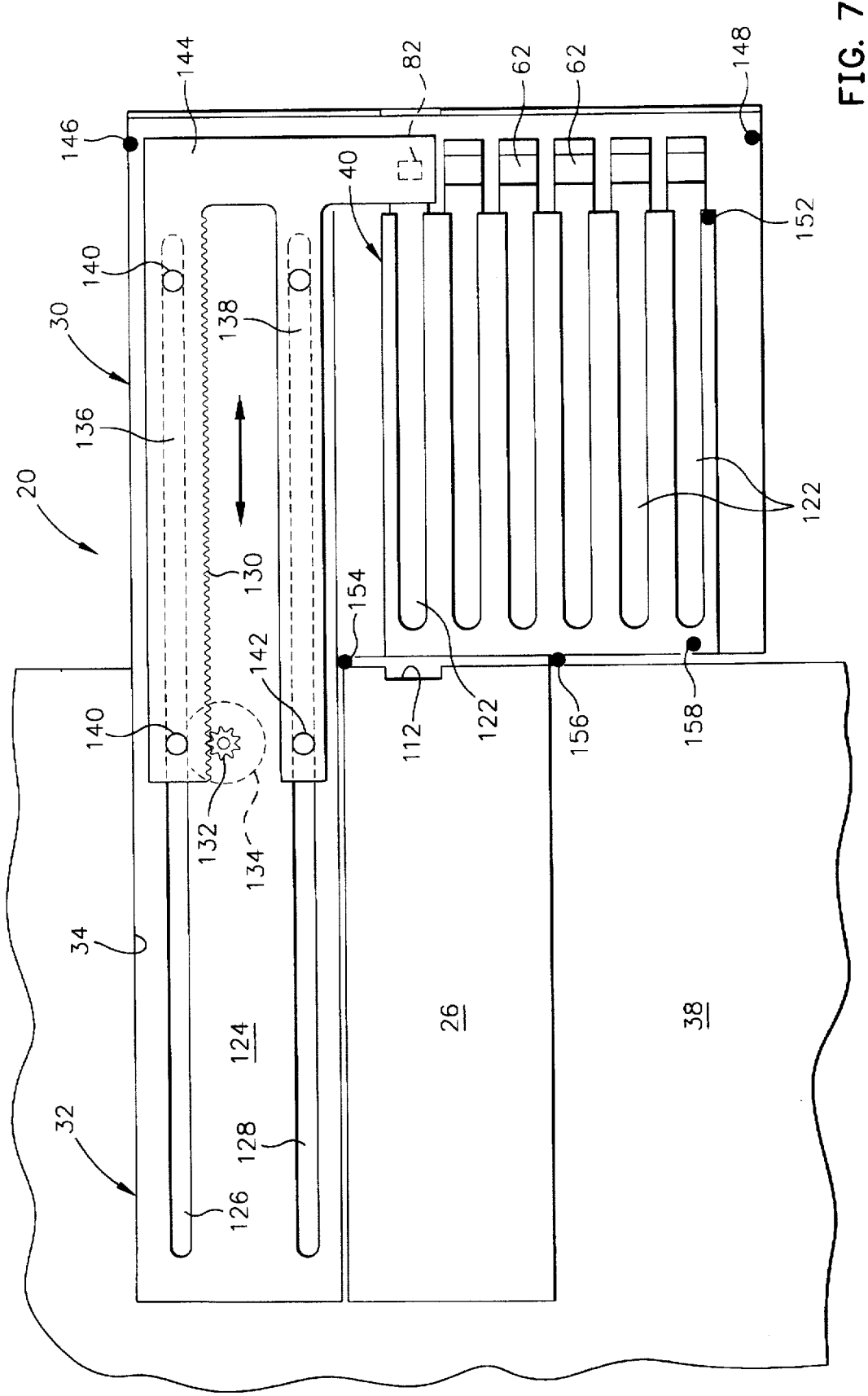
FIG. 7 is a side elevational schematic illustration of a second side of the plugable stackloader plugged into a personal computer with the side cover removed and with a horizontal cartridge moving device shown in a retracted position.

FIG. 7 is an illustration of the left side of the stackloader with the plug 32 plugged into the slot 34 of the personal computer 38. The left cover plate 66 has been removed to illustrate a left support plate 124 which supports a horizontal movement device which functions as a picker for inserting and withdrawing a cartridge with respect to the drive 26. The horizontal movement device includes the support plate 124 having a pair of horizontally extending top and bottom spaced apart slots 126 and 128 which extend in both the housing and plug regions of the stackloader. The horizontal movement device further includes a rack and pinion 130 and 132, the pinion 132 which are driven by a motor 134, the motor 134 being connected to the autochanger controller 42 to be described in more detail hereinafter. The rack may include top and bottom horizontally extending bars 136 and 138 which carry top and bottom pins 140 and 142, the pins slidably riding in the top and bottom horizontal slots 126 and 128. A vertical plate 144 interconnects the horizontal bars 136 and 138 and extends therebelow adjacent the left column of cartridge notches 62. Connected on an opposite side of the vertical plate 144 is the engagement block 82 (see FIG. 3) which is received by the vertical column of left notches 62 of the cartridges as the magazine 40 moves up and down within the housing 30. It should be noted once again that the engagement block 82 is horizontally aligned with the opening 112 of the drive 26 of the personal computer.

Figure 8:
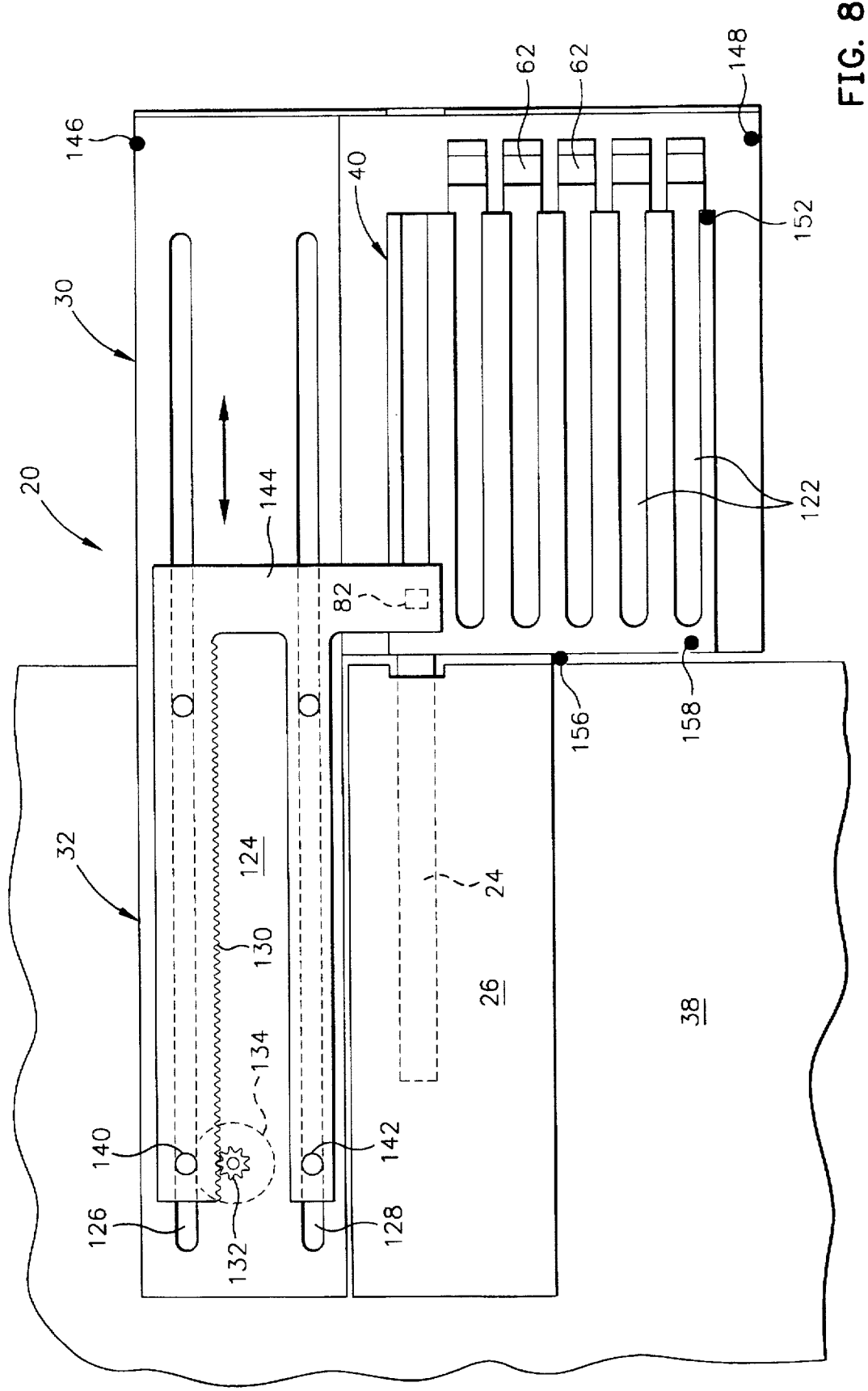
FIG. 8 is the same as FIG. 7 except the horizontal cartridge moving device is shown in an extended position.

In FIG. 7 a top cartridge in the magazine is shown in a retracted position with respect to the drive 26. In FIG. 8 the top cartridge is shown horizontally moved into the drive 26 for processing purposes. The horizontal movement has been implemented by the motor 134 and its pinion 132 which advances the rack 130 forwardly. This causes the engagement block 82 to advance the top cartridge forwardly into the drive, the engagement block riding within the top slot 122 of the magazine 40. The reverse process takes place to return the cartridge to its retracted position within the magazine, whereupon the magazine can be moved vertically again to align another selected cartridge with the opening 112 of the drive for processing.

Shown schematically in FIGS. 7, 8 and 5 are dots which represent various sensors for sensing the operational status of the stackloader. Infrared emitters and sensors can be employed to sense various conditions. For instance, an emitter 146 and a sensor 148 in the way of the vertical plate 144 of the horizontal movement device sense the Horizontal Home Position of a vertical plate 144. An emitter 150 (see FIG. 5) and a sensor 152 (see FIGS. 7 and 8) in the way of the bottom of the magazine 40 sense the bottom or Vertical Home Position of the magazine 40. An emitter 154 and a sensor 156 (see FIG. 7) in the way of the processing path of a cartridge will detect that a cartridge is in this path and prevents the vertical movement of the magazine.

Sensor 158 is employed for identifying the type of magazine, the magazine's ID, and the type of media housed by the magazine. In this regard, the sensor 158 may comprise one or multiple sensors for reading this information. Magazines can have multiple media types. This sensor senses this information from binary markings 162 on the corner of the magazine as schematically illustrated in FIG. 6. The binary markings may comprise reflective sensors, bar codes other binary markings, or even other non-binary machine-readable markings. All of these sensors and emitters can be mounted on the innersides of the coverplates 64 and 66 (see FIG. 4).

Figure 9:
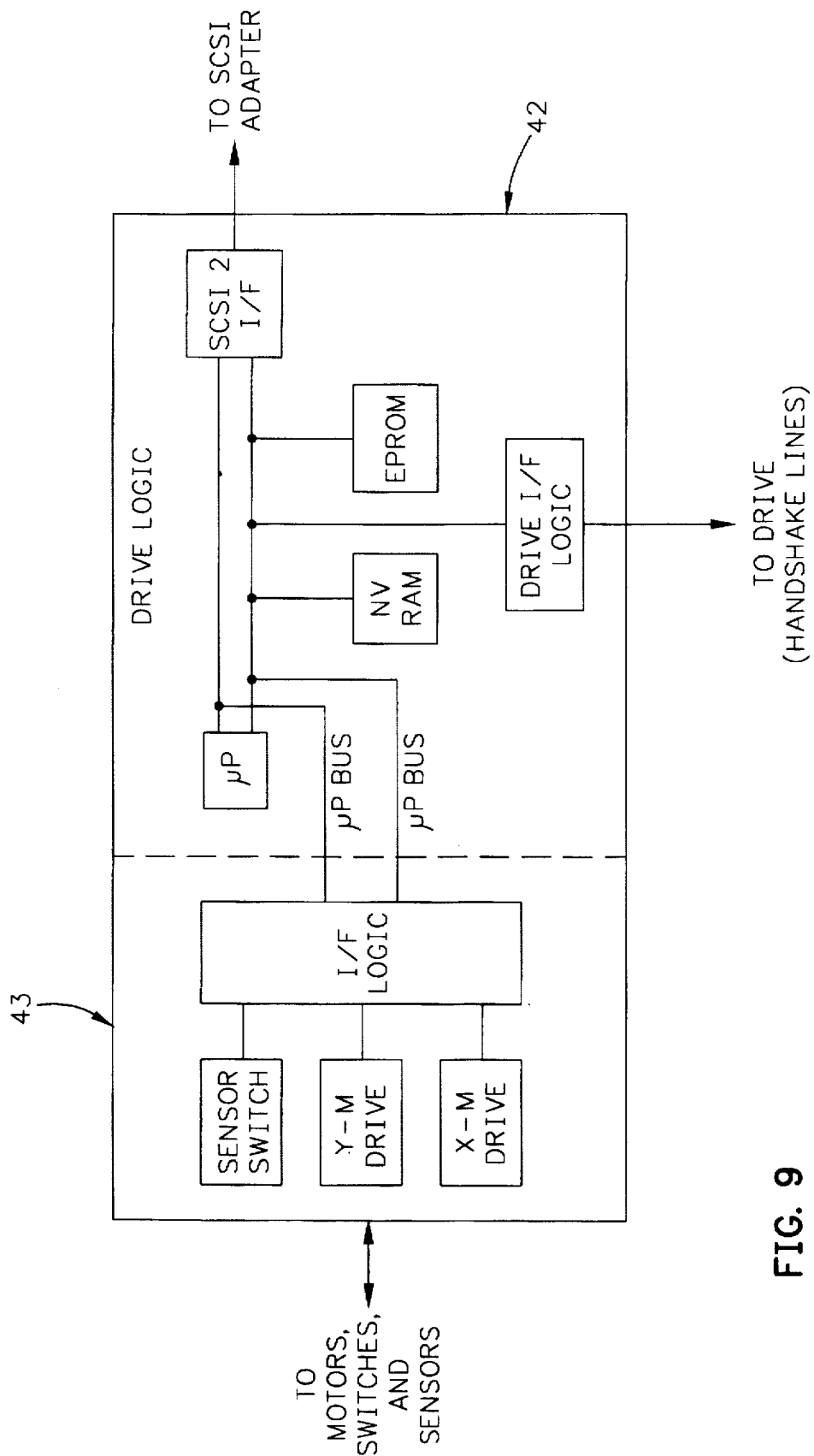
FIG. 9 is a block diagram of an autochanger controller.
Figure 10:
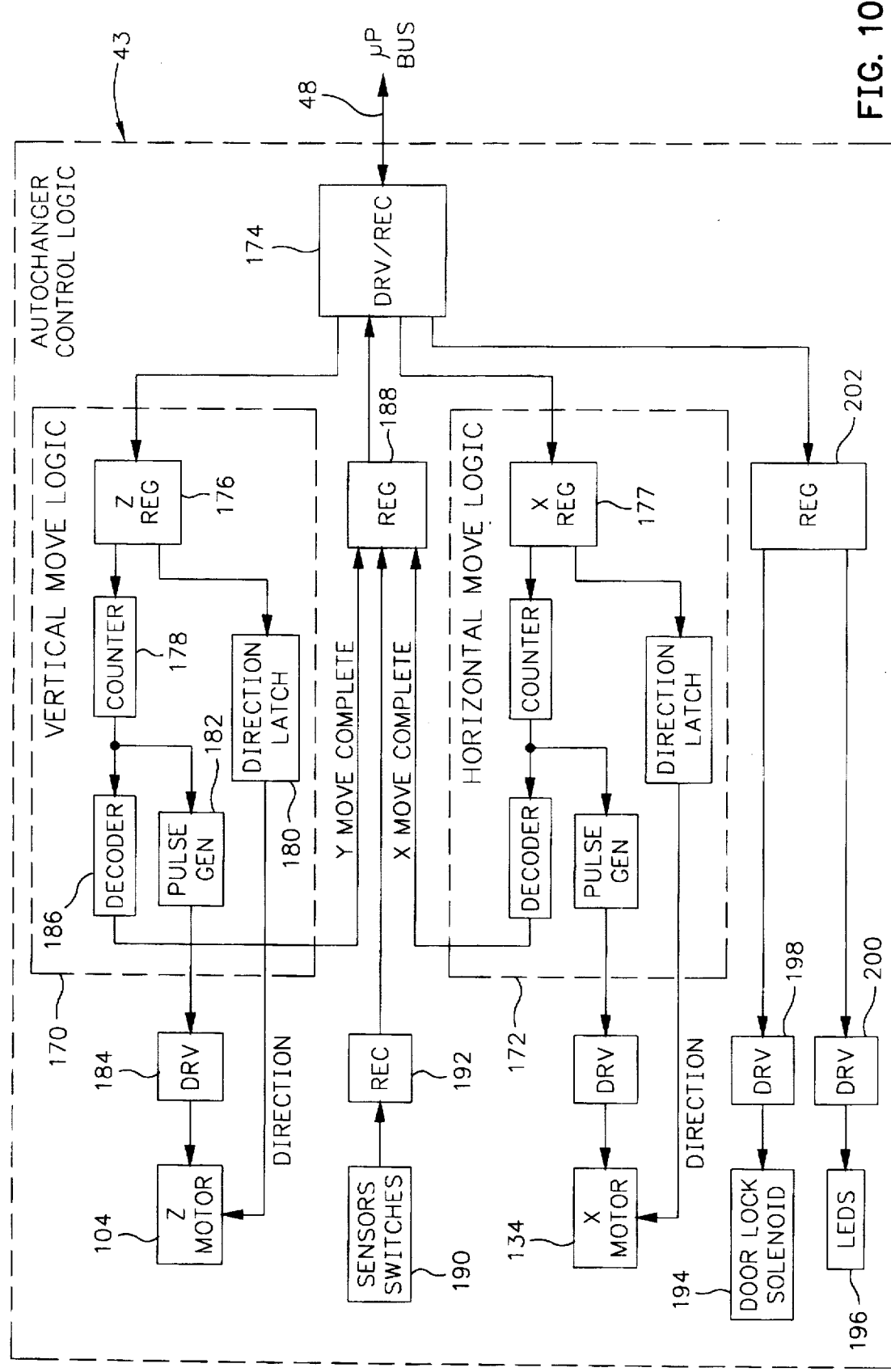
FIG. 10 is a block diagram of logic of the autochanger controller.

A block diagram for an exemplary autochanger controller 42 is illustrated in FIG. 9. It consists of a microprocessor NVPAM, EPROM, drive interface logic for handshaking, a SCSI interface and autochanger control logic 43. Details of the autochanger control logic 43 is shown in FIG. 10. Standard SCSI commands are received over the SCSI interface, stored in the NVRAM and are interpreted by the microprocessor. The program is stored in the EPROM. The microprocessor then writes control information into the Z register 176, the X register 177 and register 202 in the autochanger control logic (FIG. 10) to move cartridges to and from the drives. Sense information is determined by reading register 188.

The autochanger controller 16 is connected to the motherboard 46 of the computer via the SCSI 48 as shown in FIG. 1. As is typical, the motherboard 46 includes a microprocessor (not shown) which is coupled to the SCSI 48. As shown in FIG. 10, vertical move logic for the Z direction is generally shown at 170 and horizontal move logic for the X direction is generally shown at 172. Since the vertical and horizontal logic are essentially the same, the description will be directed only to the vertical move logic 170. All signals to and from the autochanger logic control 43 are received through drivers and receivers 174. The microprocessor of the computer writes to a Z register 176 with a count and a direction. The count represents the extent to which the magazine is to be moved vertically within the housing of the stackloader and the direction indicates whether the magazine is to move up or down. The contents of the register 176 are transferred to a counter 178 and a direction latch 180. The counter 178 decrements and causes a pulse generator 182 to send one pulse to the Z motor 104 for each counter decrement via a driver 184. The Z motor 104 is an incremental motor which moves one increment for each count. The motor 104 moves the magazine up or down depending upon the contents of the direction latch 180. When the counter 178 reaches zero, the output of a decoder 186 is zero which indicates that the operation has been completed. This indication is transferred to a register 188. This condition, as well as all conditions of the operation of the autochanger control logic 43 can be read by the microprocessor in the autochanger controller 42 by polling. The microprocessor also reads the status of sensors and switches generally shown at 190 via receiver 192 and the register 188, the sensors being described hereinabove. These sensors include, for example, the switches 197, as well as the sensors 148, 152, 156, and 158.

The operation of the locking solenoid 194 and visual indicators (e.g. LEDs) 196 are also controlled by the microprocessor via drivers 198 and 200, respectively, and via a register 202 and drivers and receivers 174.

The chart entitled "Mode Select Command for Drive/Media Characteristics", shown in Table 1 hereinbelow, explains how the stackloader can be adapted to handle different media for different drive types.

TABLE 1

"Mode Select Command for Drive/Media Characteristics"

Drive 1 Type
Loader of Drive 1 in Stepper Increments to Vertical Home Position
Drive 1 Horiz, Travel in Stepper Increments to Horizontal Home Position
Drive 2 Type
Loader of Drive 2 in Stepper Increments to Vertical Home Position
Drive 2 Horiz, Travel in Stepper Increments to Horizontal Home Position

| Centerline of Media #1 to Vertical Home Position | Cell Type |
|---|---|
| Centerline of Media #2 to Vertical Home Position | Cell Type |
| . | . |
| . | . |
| . | . |
| Centerline of Media #N to Reference Point | Cell Type |

The stackloader uses the ANSI standard library command set. For example, a move command has a source and a destination. The source is the position of the media in the stackloader and the destination is the drive loader opening. A new mode select command would allow the microprocessor of the personal computer to set the media location, the horizontal travel, the media quantity, cell type and location of the opening to the drive with respect to the media location. This allows the stackloader to use different media types in the same magazine or different magazines in the same stackloader. It also offers the flexibility to reconfigure the stackloader to function with future drive types. Multiple magazines may be put into the stackloader. The key mechanical parameter information would be sent to the stackloader using the mode select command as shown in the above chart.

Assuming that the computer has two different drive types, such as an optical drive 26 and a floppy drive 28, as illustrated in FIG. 1, and that different cartridges are required to be moved different horizontal distances into a drive type, the microprocessor is programmed to know the number of stepper increments to move the magazine vertically and the number of stepper increments to move a cartridge horizontally for each type of drive and each type of cartridge employed in the system. Further, the microprocessor is programmed with the distance in increments from the vertical centerline of each cartridge to a reference point and the type of cartridge involved. Accordingly, the stackloader can handle all different kinds of media and drive types. The stackloader can be adapted to handle multi magazines with each magazine having the same media or multi media types.

In the embodiment of the stackloader described hereinabove, the horizontal cartridge picker apparatus does not insert the whole cartridge into the drive, as illustrated in FIG. 8. In another embodiment of the stackloader, the horizontal picker device may be modified to push a standard cartridge completely within the drive and after processing push the standard eject button (not shown) on a personal computer to return the cartridge to the horizontal picker device. This would require a somewhat more complex horizontal picker device, and therefore, the horizontal picker apparatus described hereinabove is preferred. With the preferred picker, a portion of the cartridge is outside of the drive during processing.

What has been described is a stackloader that plugs into a full or half high 5¼ inch slot in the front of a personal computer which has one or more drives in one or more slots therebelow. A vertical moving device is employed to move a magazine up and down within the stackloader so that a cartridge can be aligned with an opening in a selected drive. A horizontal moving device moves the cartridge into and out of the drive. An autochanger controller accepts commands from the motherboard of the personal computer via a SCSI interface which is standard in most personal computers. Either cartridges or magazines can be entered or removed from the stackloader. Further, commands can be made which configure the stackloader to accept various types of magazines and cartridges based upon a certain number of incremental movements horizontally and vertically. The operator can insert or remove cartridges from a magazine within the stackloader while the stackloader is not in an active status.

Figure 12:
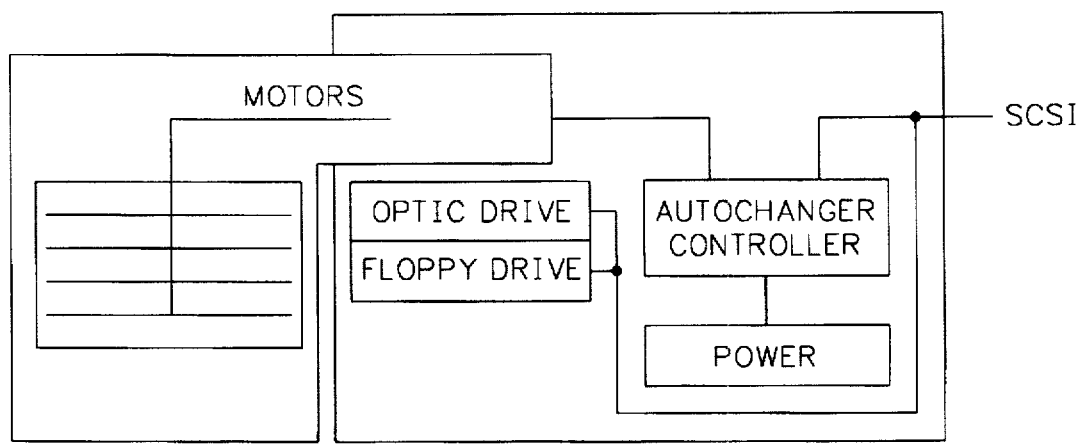
FIG. 12 is a side elevational schematic illustration of the plugable stackloader in a standalone configuration.

The stackloader described hereinabove receives power from the personal computer. An alternate configuration would be a standalone stackloader 204 illustrated in FIG. 12. In this embodiment the stackloader plugs into a housing which includes an optical drive and a floppy drive with its own power source. The autochanger controller is interfaced with a personal computer via the SCSI interface.

OPERATION

In addition to the hardware environment described above, the present invention also includes a method for operating a pluggable stackloader. FIGS. 11 and 13–17 depict different aspects of an exemplary operational sequence for carrying out the method of the invention.

Figure 18:
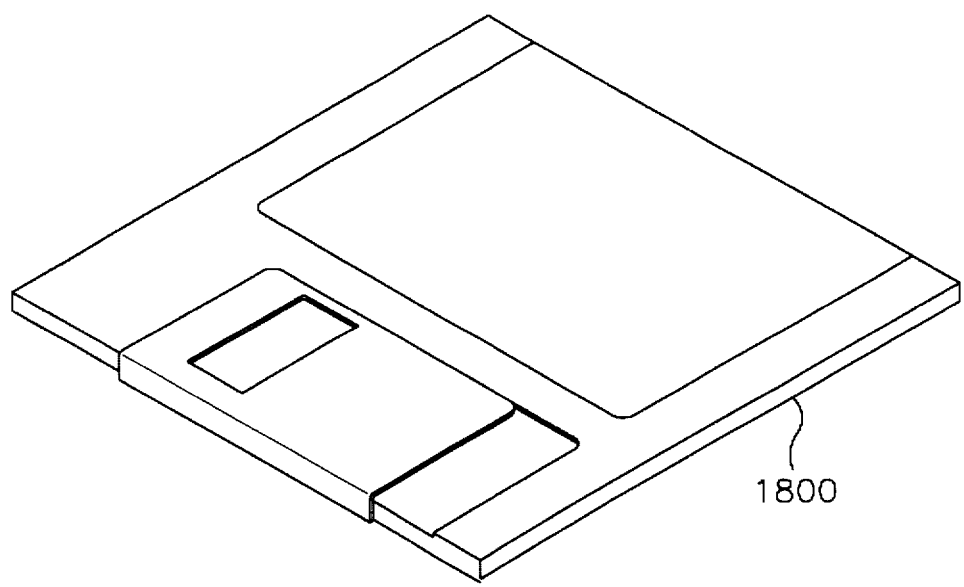
FIG. 18 is a diagram of an exemplary data storage device in accordance with one aspect of the invention.

In an illustrative embodiment of the invention, these sequences may be implemented by one or more hardware devices of the system 10 executing various lines of computer-executable instructions. These instructions may reside in some storage component of the system 10, for example, such as RAM (not shown) of the executing hardware device. Alternatively, the instructions may be contained on a data storage medium, such as a computer diskette 1800 (FIG. 18). Alternatively, the instructions may be stored on a DASD array, magnetic tape, conventional "hard drive", electronic read-only memory, optical storage device, paper "punch" cards, or another data storage device. In an illustrative embodiment of the invention, the computer-executable instructions may comprise lines (not shown) of compiled C++ language code.

Overall Data Access Routine

Figure 13:
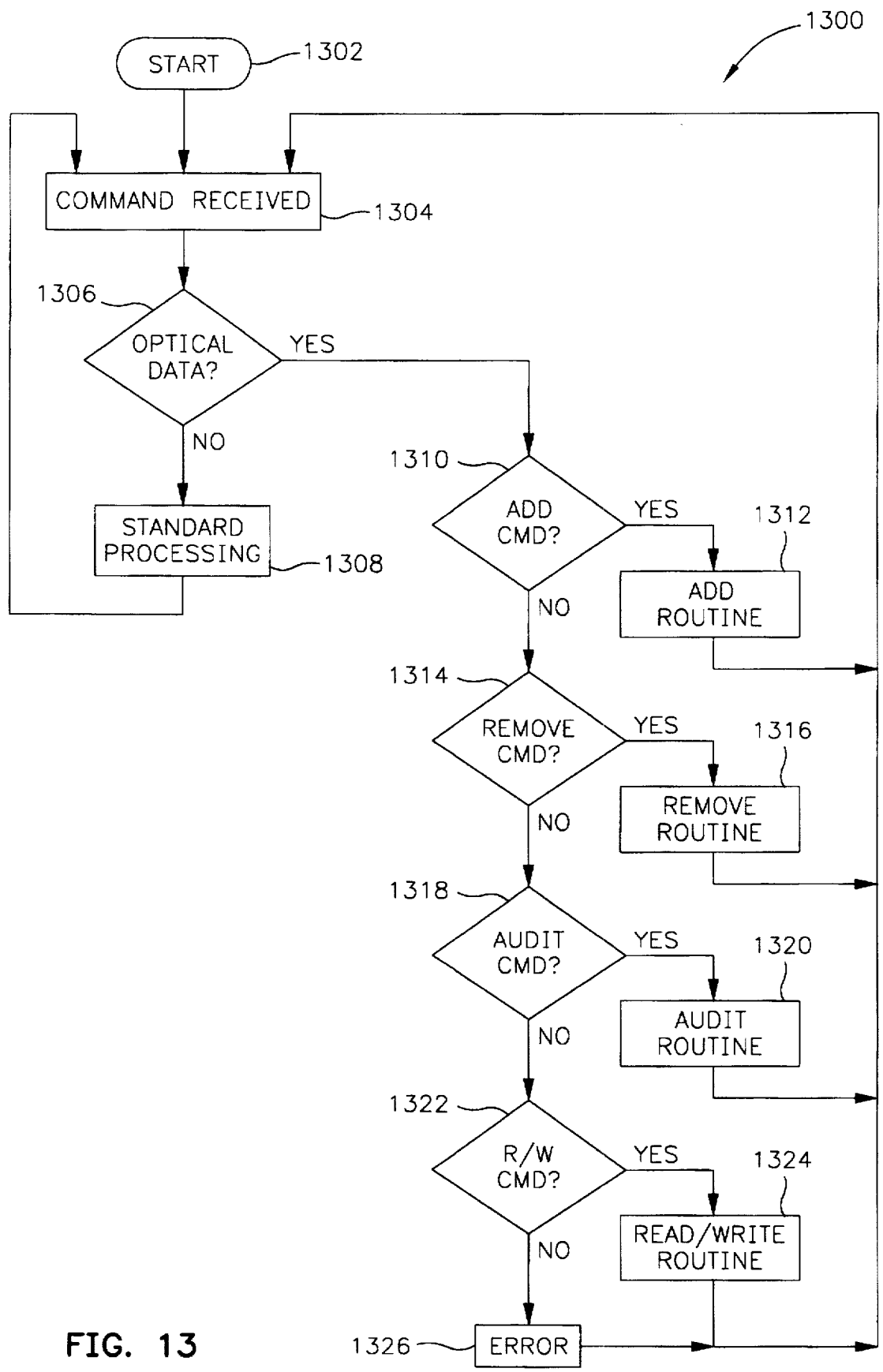
FIG. 13 is a flow diagram illustrating an example of an overall routine for performing data access pursuant to the invention.

In the invention's preferred embodiment, data access may be performed according to the sequence generally illustrated in FIG. 13. This sequence, which includes a number of tasks 1300, manages the system's cartridges and magazines by performing various operations, such as (1) adding or removing cartridges from magazines, (2) auditing magazine inventory, and (3) facilitating cartridge data access, such as reading data from cartridges and writing data to cartridges.

To discuss the routine 1300 in greater detail, reference is made to FIG. 13. The routine 1300 is performed by various components of the system 10 (FIG. 1A) in cooperation with each other, as discussed below. The routine 1300 is initiated by the host computer 38, and particularly the host operating system 11, in response to receipt of a data access command in task 1304. The data access command comprises a command requesting some type of access to cartridges housed or accessible by the stackloader 20. In one scenario, the data access command may be originally entered by a operator, using the keyboard display 50 to request access to the stackloader's storage media. In a different scenario, the data access command may be originally supplied by the host computer 38 or another computer, such as the LAN-connected computer 21. Computer-originated data access commands may result, for example, from a need for data occurring within the application program 12.

Preferably, the command received in task 1304 includes a command-type and an operand. The command-type specifies a particular type of storage access operation, such as ADD, REMOVE, AUDIT, READ, or WRITE, in the illustrated example. The operand identifies a desired object for performing the access operation, e.g. a file. The operand includes a number of fields, which may differ for different operations, as shown below.

READ/WRITE Commands

With READ or WRITE commands, the operand includes the magazine, volume identifier ("vol-id"), subdirectory, filename, and filename extension, assembled in the following form:

drive:\{magazine\}vol-id\{subdirectory\}filename.ext

The "drive" field identifies the stackloader 20 against other storage devices such as the fast-access storage unit 15. The "magazine" field identifies the magazine 22 that contains the desired cartridge. The magazine field may comprise, for example, an alphanumeric name uniquely distinguishing the desired magazine from other magazines. Since the magazine field is optional, it is shown in brackets. The "vol-id" field identifies a storage "volume" containing the desired file. The volume may encompass a part of one cartridge, an entire cartridge, or even multiple cartridges. In the illustrated embodiment, each vol-id corresponds to one cartridge, and each cartridge's vol-id is also recorded as an item of data on the storage media of that cartridge.

The "subdirectory" field identifies a subdirectory on the volume where the desired file resides. In one embodiment, with multi-cartridge volumes, different subdirectories may refer to different media types, e.g. one subdirectory corresponding to a 120 mm optical medium contained in the magazine, and another subdirectory corresponding to a 60 mm optical medium contained in the magazine. The subdirectory field is shown in brackets, since it is optional. The "filename.ext" field comprises an alphanumeric sequence identifying the desired file, and may comprise a filename compatible with the well known disk operating system ("DOS").

ADD Commands

With ADD commands, the operand is assembled in the following form:

drive:\vol-id\magazine\receptacle

The "receptacle" field specifies the magazine receptacle 114 intended for receipt of a cartridge to be added.

REMOVE Commands

With REMOVE commands, the operand is assembled in the following form:

drive:\vol-id\magazine

AUDIT Commands

With AUDIT commands, the operand is assembled in the following form:

drive: magazine-1, magazine-2, . . . magazine-N

Each term in the operand, such as "magazine-1", identifies a different magazine that is targeted for auditing, in the same order. If no magazine is specified, the currently mounted magazine is audited.

If the command received in task 1304 is entered manually via the keyboard display 50, the magazine and subdirectory components may be omitted, for the convenience of the operator. If the magazine identifier is omitted, the command is considered to refer to the magazine currently mounted in the stackloader 20. If the subdirectory is omitted, the root directory is referenced as a default.

Preferably, the inventory (not shown) is stored on the fast-access storage unit 15 (FIG. 1A), or another quickly accessible and reliable storage location. The inventory lists all cartridges in the system 10, lists all magazines 22 in the system 10, and indexes each cartridge to the magazine containing that cartridge.

Having received the data access command in task 1304 from the operator, the application program 12, or another source such as a LAN-connected computer 21, the host operating system 11 performs query 1306. In query 1306, the host operating system 11 asks whether the command has requested access to data managed by the stackloader 20. In the illustrated example, this data is stored on optical media. If the received data access command seeks data other than optical data, such as data contained in the fast-access storage unit 15, the host operating system 11 executes the requested data access in task 1308, without involving the stackloader 20.

However, if the received data access command seeks data managed by the stackloader 20, the host operating system 11 passes control to the stackloader controller 14. The stackloader controller 14 then performs appropriate ones of queries 1310, 1314, 1318, and 1322 to determine what command-type was specified in the data access command.

More particularly, in query 1310 the stackloader controller 14 determines whether the received command was an ADD command, i.e. a command to add a new cartridge to a magazine. If so, the controller 14 performs the ADD routine (described below) in task 1312 and then returns to task 1304 to await receipt of another data access command.

If the data access command is not an ADD command, query 1310 directs control to query 1314, in which the stackloader controller 14 determines whether the received command was a REMOVE command, i.e. a command to remove an existing cartridge from a magazine. If so, the controller 14 performs the REMOVE routine (described below) in task 1316 and then returns to task 1304 to await receipt of another data access command.

If the data access command is not an ADD or REMOVE command, queries 1310 and 1314 direct control to query 1318, in which the stackloader controller 14 determines whether the received command was an AUDIT command, i.e. a command to review the status of the cartridge and magazine inventory. If so, the controller 14 performs the AUDIT routine (described below) in task 1320 and then returns to task 1304 to await receipt of another data access command.

If the data access command is not an ADD, REMOVE, or AUDIT command, queries 1310, 1314, and 1318 direct control to query 1322, in which the stackloader controller 14 determines whether the received command was a READ or WRITE command, i.e. a command to read data from, or write data to, an existing cartridge. If so, the controller 14 performs the READ/WRITE routine (described below) in task 1324 and then returns to task 1304 to await receipt of another data access command. As an example, the ADD 1312, REMOVE 1316, AUDIT 1320, and READ/WRITE 1324 routines may be implemented as separate subroutines.

In the illustrated system 10, if the data access command is not identified as an ADD, REMOVE, AUDIT, or READ/WRITE command, an error has occurred. Accordingly, in task 1326 an error message is generated and sent to the source of the faulty data access command, e.g. the keyboard display 50, application program 12, host operating system 11, LAN-connected computer 21, or other source.

Add Operation

Figure 14:
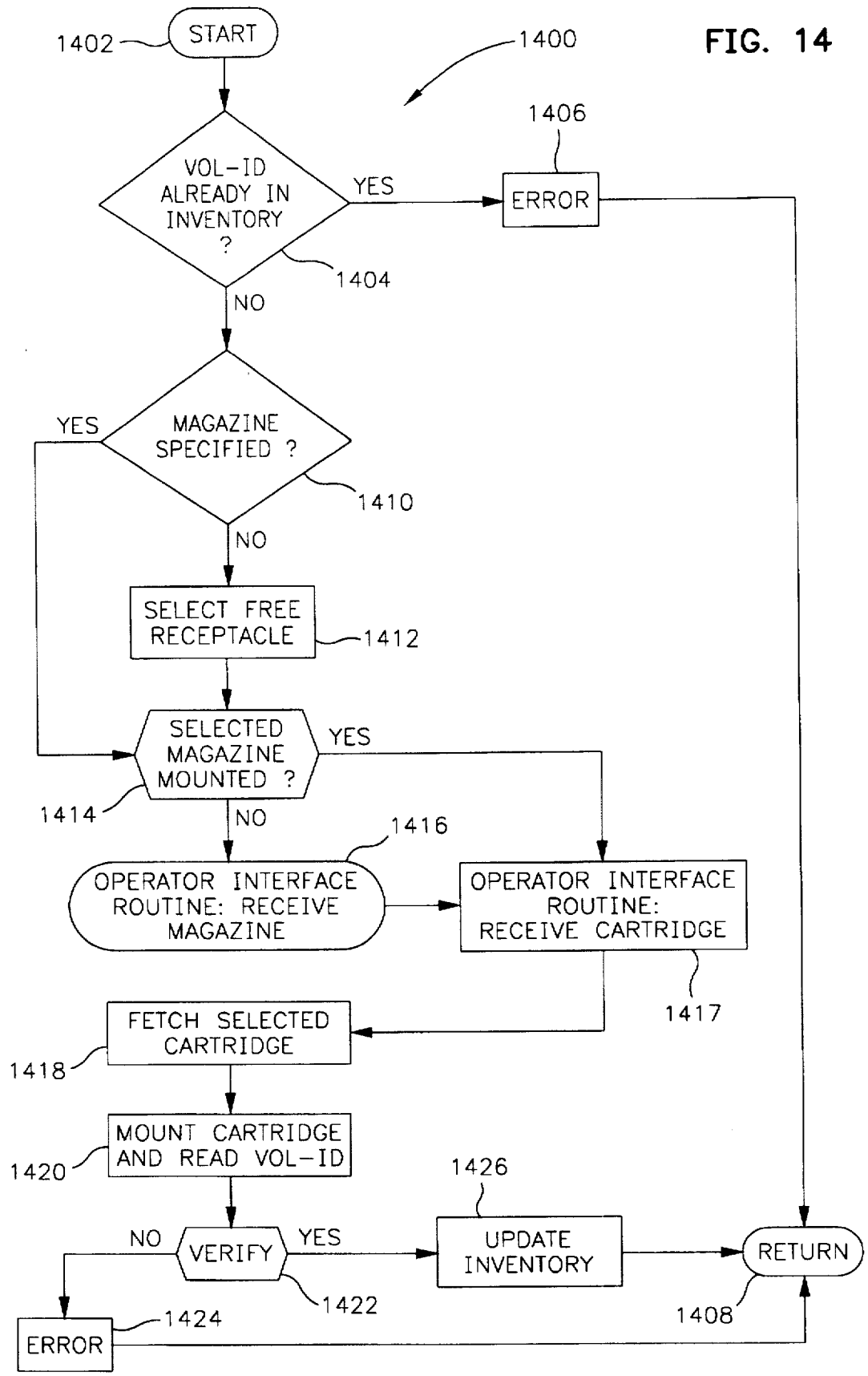
FIG. 14 is a flow diagram illustrating an example of a routine for adding a cartridge to the stackloader of the invention.

In the invention's preferred embodiment, ADD operations may be performed according to the sequence generally illustrated in FIG. 14. This sequence, which includes a number of tasks 1400, generally functions to receive a "target cartridge" into one of the magazines 22 and log the cartridge's identity and location into the inventory.

The ADD routine 1400 is largely performed by the stackloader controller 14. The routine 1400, which corresponds to task 1312 (FIG. 13), starts in task 1402 when query 1310 (FIG. 13) determines that an ADD access command has been issued. As mentioned above, an ADD data access command includes a drive, vol-id, magazine, and receptacle. In query 1404, the stackloader controller 14 determines whether the vol-id specified in the data access command appears in inventory. If so, then "adding" this cartridge is not possible, since it is already present in the system 10; in this case, an error message is issued in task 1406, and the routine 1400 exits in task 1408.

However, if a new vol-id has been specified by the data access command, the stackloader controller 14 goes to query 1410 to determine whether the data access command specified a magazine in which to add the target cartridge. If not, the stackloader controller 14 in task 1412 selects a free magazine receptacle 114 in a currently-loaded magazine. After task 1412, or an affirmative answer to query 1410, the stackloader controller 14 in task 1414 asks whether the stackloader 20 is currently coupled to the magazine that was (1) previously specified in a data access command, or (2) selected in task 1412, as applicable. If the magazine is not already mounted, the stackloader controller 14 in task 1416 calls upon an operator interface routine 1100 (FIG. 11) to manage the loading of the required magazine into the stackloader 20. The operator interface routine 1100 is described in greater detail below.

With the required magazine mounted, control passes to task 1417, which calls upon the operator interface routine 1100 (FIG. 11) to manage the loading of the target cartridge. The operator interface routine 1100 provides for insertion of the target cartridge into the receptacle specified in the data access command. As described below, the operator interface routine 1100 also illuminates the indicator 195a that is adjacent to the specified receptacle, to aid the operator in inserting the target cartridge into the correct receptacle.

After the target cartridge is added, the stackloader controller 14 and the autochanger controller 16 in task 1418 cooperatively fetch the target cartridge. In task 1420, the controllers 14/16 mount the target cartridge to the drive 26 and read the vol-id contained thereon.

Then, in query 1422, the stackloader controller 14 verifies that the vol-id found in task 1420 agrees with the vol-id listed in inventory for that cartridge. If these vol-ids do not match, an error message is issued in task 1424, and the routine ends in task 1408. If the vol-ids agree, however, the stackloader controller 14 in task 1426 updates the inventory to reflect the addition of the target cartridge, and the routine 1400 ends in task 1408.

As an alternative to portions of the routine 1400 described above, the original ADD data access command may omit the vol-id of the cartridge to be added. In this case, the cartridge's vol-id may be learned nonetheless during task 1420 when the controllers 14/16 mount the cartridge to the drive 26 and read the vol-id contained thereon. Moreover, the ADD routine 1400 may be modified by an ordinarily skilled artisan (having the benefit of this disclaimer) to provide for the addition of magazines, as well as cartridges, to the stackloader 20.

Remove Operation

Figure 15:
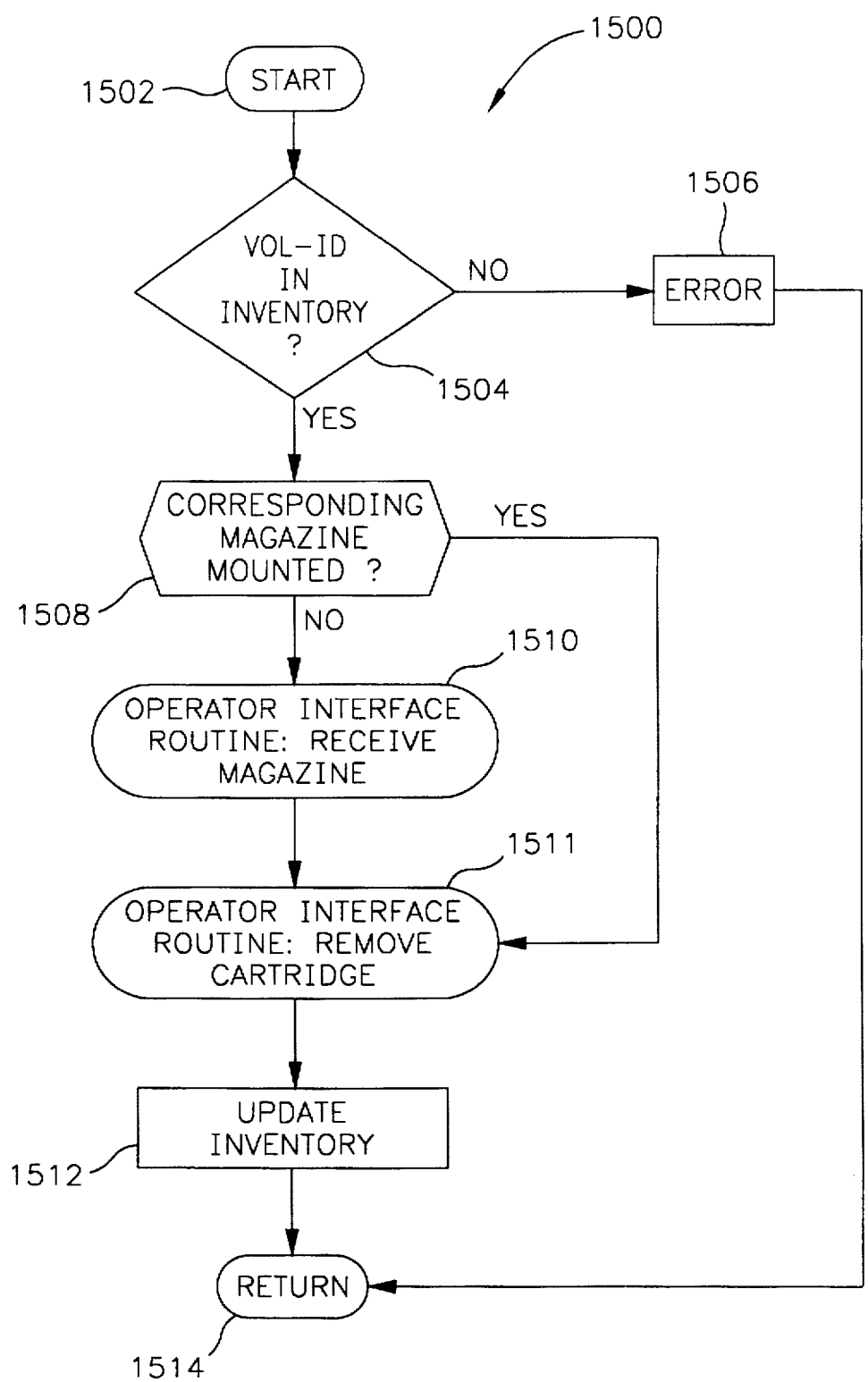
FIG. 15 is a flow diagram illustrating an example of a routine for removing a cartridge from the stackloader of the invention.

In the invention's preferred embodiment, REMOVE operations may be performed according to the sequence generally illustrated in FIG. 15. Although not shown, the REMOVE command alternatively may facilitate the removal of an entire magazine in addition to the removal of single cartridges. This sequence, which includes a number of tasks 1500, generally oversees removal of a target cartridge from one of the magazines 22, as well as withdrawal of the listing for the cartridge in inventory.

The REMOVE routine 1500 is largely performed by the stackloader controller 14. The routine 1500, which corresponds to task 1316 (FIG. 13), starts in task 1502 when query 1314 (FIG. 13) determines that a REMOVE data access command has been issued. As mentioned above, a REMOVE command includes a drive, vol-id, and magazine. In query 1504, the stackloader controller 14 determines whether the vol-id specified in the data access command appears in inventory. If not, then "removing" this cartridge is not possible, since it is not present in the system 10; in this case, an error message 1506 is issued, and the routine 1500 exits in task 1514.

However, if a valid vol-id has been specified by the data access command, the stackloader controller 14 goes on to query 1508 to determine whether the magazine containing the target cartridge corresponding to the specified vol-id is presently mounted to the stackloader 20. To do this, the presently mounted magazine is identified by operating the sensor 158 to read the marking 162 (FIGS. 6, 8) on the currently-mounted magazine, and then cross-referencing the marking to the inventory. Alternatively, if the presently mounted magazine has previously been identified using the sensor 158 during initial loading of the magazine or another operation, the identification of the magazine may be skipped, as well as the cross-referencing step if already performed. In either case, if the magazine containing the target cartridge is not already mounted, the autochanger controller 16 in task 1510 performs the operator interface routine 1100 (described below, FIG. 11) to manage the loading of the required magazine into the stackloader 20.

After task 1510, or an affirmative answer to query 1508, the autochanger controller 16 in task 1511 again performs the operator interface routine 1100 (FIG. 11) to permit the operator to remove the target cartridge. As described below, the operator interface routine 1100 also illuminates the indicator 195a that is adjacent to the receptacle 114 containing the target cartridge, to aid the operator in removing the target cartridge from the correct receptacle.

After task 1511, the stackloader controller 14 in task 1512 updates the inventory to reflect the absence of the target cartridge. The routine 1500 then ends in task 1514.

It will also be apparent to ordinarily skilled artisans (having the benefit of this disclosure) that the REMOVE routine 1500 may be modified to provide for the removal of magazines, as well as cartridges, from the stackloader 20.

Audit Operation

Figure 16:
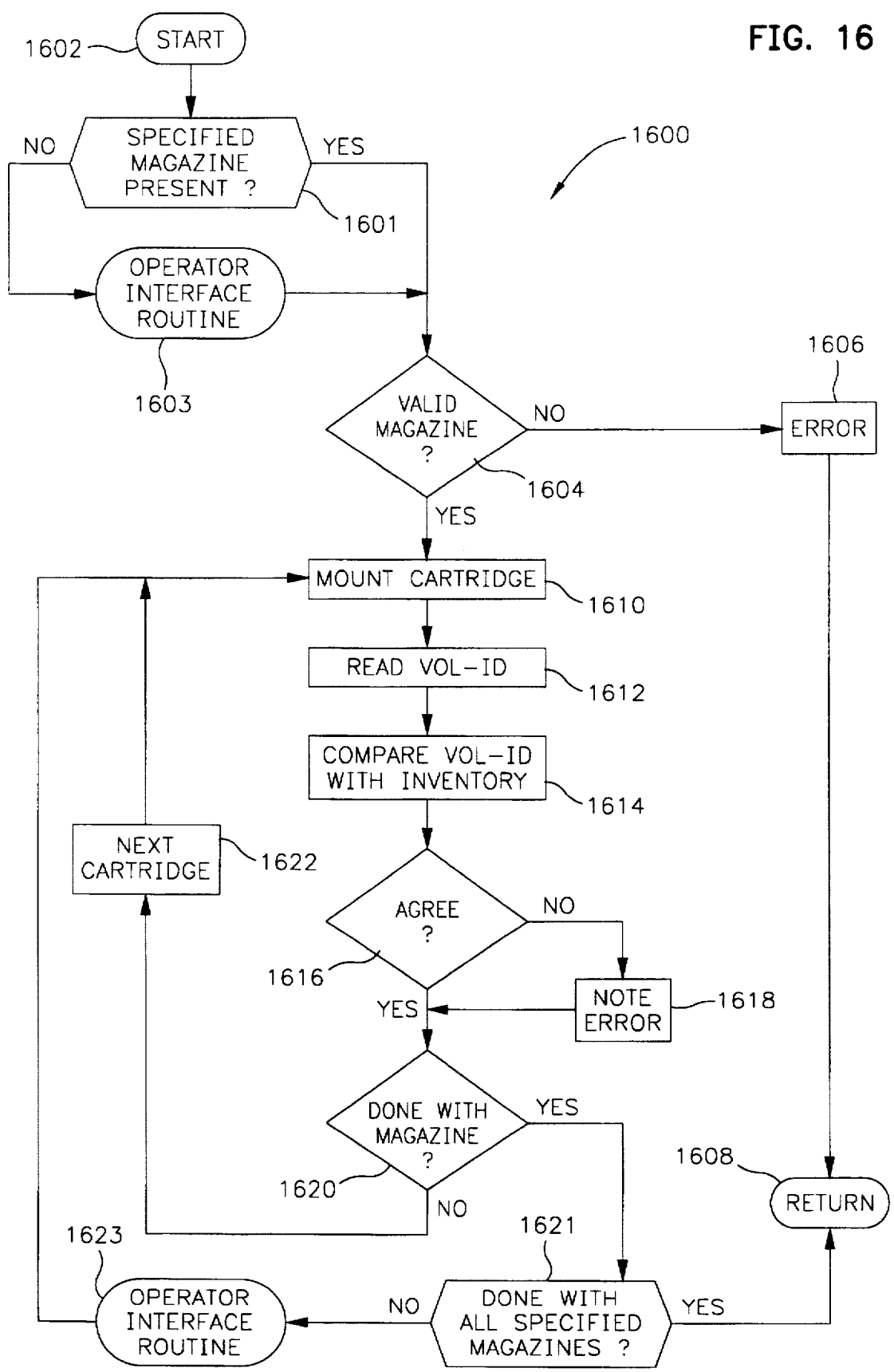
FIG. 16 is a flow diagram illustrating an example of a routine for auditing inventory pursuant to the invention.

In the invention's preferred embodiment, AUDIT operations may be performed according to the sequence generally illustrated in FIG. 16. This sequence, which includes a number of tasks 1600, generally operates to determine which receptacles in each magazine contain a cartridge, and for each cartridge, what vol-id(s) reside on that cartridge.

The AUDIT routine 1600 is largely performed by the stackloader controller 14, with assistance from the autochanger controller 16. The routine 1600, which corresponds to task 1320 (FIG. 13), starts in task 1602 when query 1318 (FIG. 13) determines that a AUDIT data access command has been issued. Alternatively, or additionally, the AUDIT routine 1600 may be performed automatically whenever a magazine or cartridge is inserted into the stackloader 20; advantageously, this ensures that any new cartridge or magazine is automatically logged into the inventory, and made available to any other host computers having LAN links to the stackloader 20.

As mentioned above, an AUDIT command includes a drive and one or more magazine identifiers. Task 1601 begins with the first specified magazine (or another predetermined cartridge), using the stackloader controller 14 to determine whether this magazine is present. If not, the autochanger controller 16 in task 1603 performs the operator interface routine 1100 (FIG. 11) to obtain and mount the specified magazine. After task 1603 or a positive answer to query 1601, as applicable, the stackloader controller 14 in query 1604 determines whether the currently-mounted magazine is valid, i.e. corresponds to a magazine listed in inventory. If not, an error message is issued in task 1606 and the routine ends in task 1608. The magazine's validity is determined by first operating the sensor 158 to read the markings 162 (FIGS. 6, 8) on the magazine to obtain the magazine's identifier. Then, the stackloader controller 14 attempts to cross-reference the marking with the inventory listing. Alternatively, if the presently mounted magazine has previously been identified using the sensor 158 during initial loading of the magazine or another operation, the identification of the magazine may be skipped, as well as the cross-referencing step if already performed.

If the magazine is found valid, the autochanger controller 16 in task 1610 mounts a first one of the cartridges contained in the magazine. As an example, the first cartridge may be the top-most or bottom-most cartridge, or another predetermined cartridge. After the optical drive 27 reads the mounted cartridge's vol-id in task 1612, the stackloader controller 14 in task 1614 compares the vol-id with the vol-id listed in inventory for that cartridge. If the stackloader controller 14 in query 1616 finds that these two vol-ids do not agree, the stackloader controller 14 in task 1618 notes the error in an error log maintained in a suitable storage location of the system 10.

After task 1618, or an affirmative answer to query 1616, the stackloader controller 14 asks in query 1620 whether all cartridges in the magazine have been processed, i.e. by performing tasks 1610–1618. If more cartridges in the magazine remain, the stackloader controller 14 selects another cartridge in task 1622. This cartridge may be selected, for example, by progressing through all cartridges present in the magazine in a predetermined pattern e.g. top-down, or bottom-up. After task 1622, control returns to task 1610 and proceeds from there as described above.

If query 1620 determines that all cartridges in the current magazine have been processed, control advances to query 1621, where the stackloader controller 14 determines whether all magazines that were originally specified in the data access command have been processed. If so, the routine ends in task 1608. Otherwise, the next magazine is obtained and mounted when the autochanger controller 16 executes the operator interface routine 1100 (FIG. 11) in task 1623. After task 1623, control returns to task 1610, and proceeds as discussed above.

. Read/Write Routine

Figure 17:
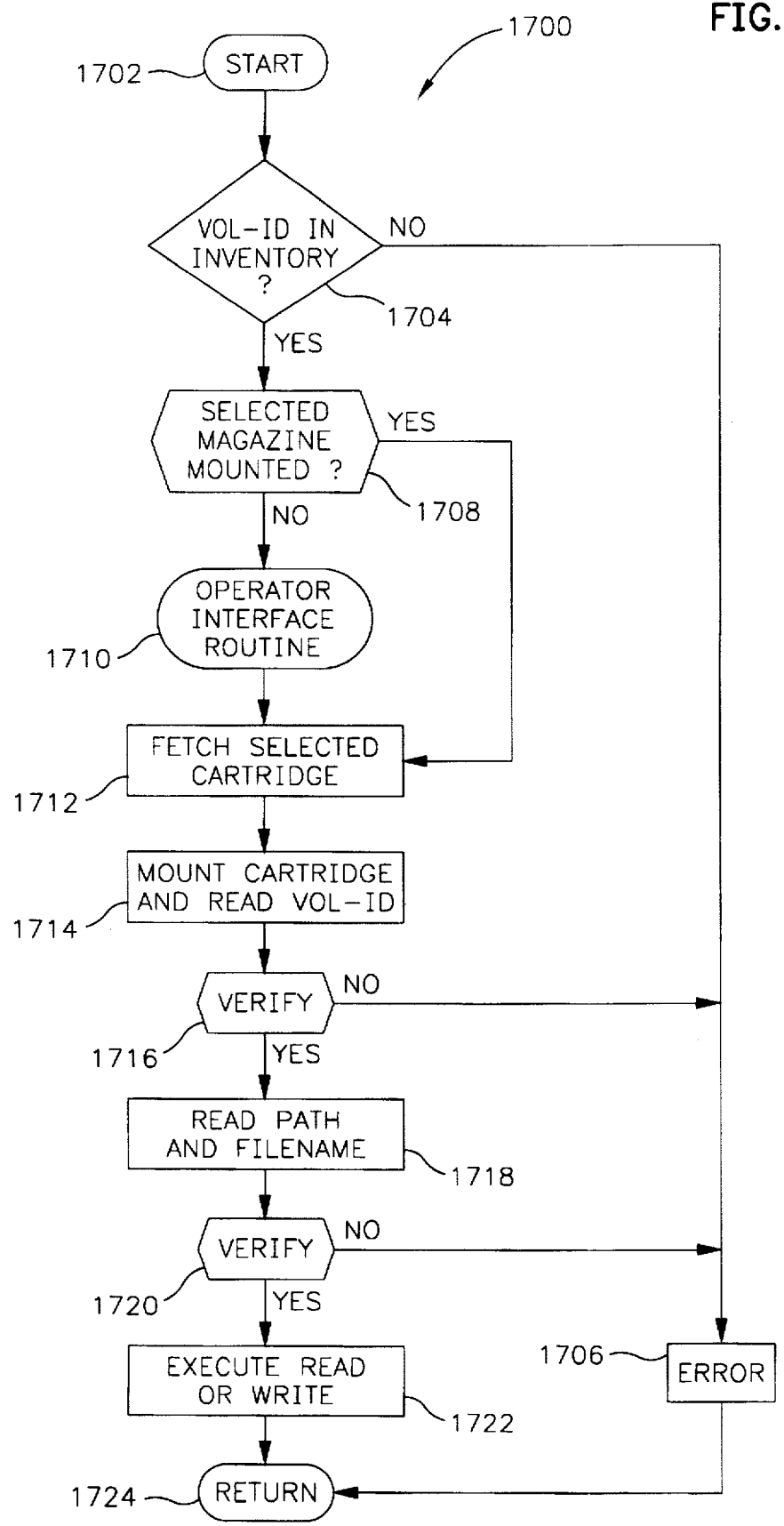
FIG. 17 is a flow diagram illustrating an example of a routine for reading data from, and writing data to cartridges using the pluggable stackloader of the invention.

In the invention's preferred embodiment, READ and WRITE operations may be performed according to the sequence generally illustrated in FIG. 17. This sequence, which includes a number of tasks 1700, generally functions to orchestrate mounting of a cartridge designated for a Read or Write operation, and then to perform Read or Write operations to the cartridge using the storage drive 26.

The READ/WRITE routine 1700 is performed by the stackloader controller 14 in cooperation with the autochanger controller 16. The routine 1700, which corresponds to task 1324 (FIG. 13), starts in task 1702 when query 1322 (FIG. 13) determines that an READ or WRITE data access command has been issued. As mentioned above, a complete data access command includes a drive, magazine, subdirectory, and filename. In query 1704, the stackloader controller 14 determines whether the vol-id specified in the data access command appears in inventory. If not, then reading or writing data from/to this cartridge is not possible; in this case, an error message 1706 is issued, and the routine 1700 exits in task 1724.

However, if the cartridge corresponding to the specified vol-id appears in inventory, control advances to query 1708. In query 1708, the stackloader controller 14 consults the inventory to identify the magazine containing the desired cartridge, and then determines whether this magazine is currently mounted in the stackloader 20. Whether the appropriate magazine is mounted in inventory can be determined by using the sensor 158 to read the marking 162 (FIGS. 6, 8) on the currently-mounted magazine. Alternatively, if the presently mounted magazine has previously been identified using the sensor 158 during initial loading of the magazine or another operation, the identification of the magazine may be skipped, as well as the cross-referencing step if already performed. In either case, if the desired magazine is not currently mounted, the stackloader controller 14 in task 1710 calls upon the operator interface routine 1100 (FIG. 11) to manage the loading of the required magazine into the stackloader 20. The operator interface routine 1100 is described in greater detail below.

With the required magazine mounted, control passes to tasks 1712 and 1714, in which the autochanger controller 16 directs the stackloader 20 to fetch and then mount the desired cartridge. Also in task 1714, the stackloader controller 14 operates the drive 26 to read the vol-id contained on the mounted cartridge. The stackloader controller 14 in query 1716 then verifies that the vol-id read in task 1714 corresponds to the vol-id listed in inventory for that cartridge. If the two vol-ids do not match, an error message is issued in task 1706.

It the vol-ids match, however, this means that the desired cartridge and the presently mounted cartridge are one and the same. Accordingly, in task 1718 the stackloader controller 14 operates the drive to search the mounted cartridge for the path (e.g. subdirectory) and filename specified previously specified in the READ/WRITE data access command. In the case of a READ command, the stackloader controller 14 in query 1720 verifies that the desired file is present on the mounted cartridge. In the case of a WRITE command, the stackloader controller in query 1720 verifies that the mounted cartridge contains the desired path and sufficient free space to receive the new file; of course, the desired file need not exist on the cartridge yet, since the WRITE command seeks to place it there. Unsuccessful verification of query 1720 leads to an error message in task 1706, and exiting from the program 1700 in task 1724. In contrast, successful verification leads to task 1722, where the stackloader controller 14 operates the drive 26 to exchange data using the drive 26, thereby carrying out the applicable Read or Write operations. After task 1722, the routine 1700 ends in task 1724.

Operator Interface Routine

Figure 11:
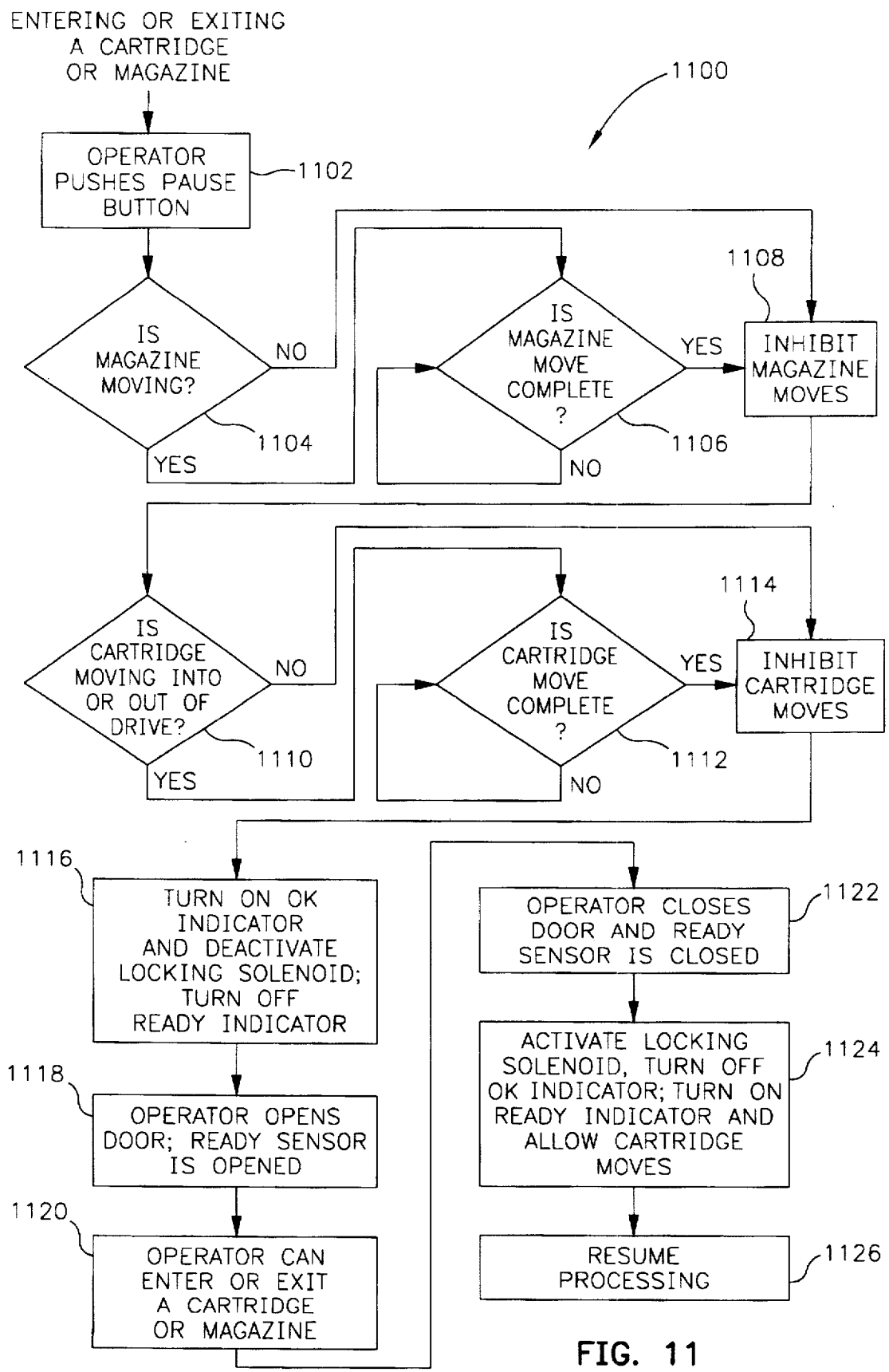
FIG. 11 is a flow diagram for entering or exiting a cartridge or magazine from the stackloader.

In the invention's preferred embodiment, the operator interface routine may be performed according to the sequence generally illustrated in FIG. 11. This sequence, which includes a number of tasks 1100, generally operates to oversee insertion and removal of cartridges from magazines mounted into the stackloader 20, as well as the insertion and removal of the magazines themselves. The handling of the cartridges and magazines may be performed by a human operator, with assistance from the system 10.

The routine 1100, which is preferably performed by the autochanger controller 16, is initiated in response to requests from the stackloader controller 14 submitted during the ADD 1400, REMOVE 1500, and READ/WRITE 1600 routines, as described above. After the routine 1100 is initiated, the operator presses the pause button 197b (FIG. 4A) in task 1102; after any ongoing stackloader operations complete, the stackloader 20 is held in a wait state for initiation of the desired cartridge or magazine access.

More particularly, in query 1104 the autochanger controller 16 determines whether the magazine is being moved, up or down to access, mount, or demount a particular cartridge as described above. If so, query 1106 waits until the magazine move is complete. Then, after the move is complete, or alternatively after a negative answer to query 1104, the autochanger controller 16 in task 1108 inhibits any further magazine movement.

After task 1108, query 1110 determines whether any one of the cartridges in the magazine is being moved in or out of the drive 26 by the stackloader 20 as described above. If so, query 1112 waits until the cartridge move is complete. Then, after the move is complete, or alternatively after a negative answer to query 1110, the autochanger controller 16 in task 11|14 inhibits any further cartridge movement.

After tasks 1108 and 1114, the stackloader 20 is effectively held in a wait state, preventing machine-initiated cartridge or magazine movement, and awaiting the operator's manual cartridge or magazine transfer. Particularly, the autochanger controller 16 in task 1116 illuminates the OK indicator 196b, which signifies that it is okay to insert or remove a cartridge or magazine. If the routine 1100 is being performed for insertion or removal of a cartridge, then in task 1116 the autochanger controller 16 sends a predetermined signal to the indicator strip 195 to illuminate the indicator 195a positioned next to the appropriate magazine receptacle 114. Alternatively, if a magazine exchange is to take place at a particular stackloader in a multiple stackloader system, all indicators 195a of the indicator strip 195 at the particular stackloader may be illuminated simultaneously to aid the operator in conducting the magazine exchange there. Also in task 1116, the autochanger controller 16 de-activates the locking solenoid 194, thereby permitting opening of the rail 70 and flange 74 for access to the cartridges or the magazine contained in the stackloader 70. The deactivation of the locking solenoid 194 likewise deactivates the READY indicator 195d, signifying that the rail 70 is no longer locked in place and the stackloader is not ready for operation.

Next, the operator in task 1118 pivotally opens the rail 70 by grasping and swinging the tab 80. When the operator opens the rail 70, this triggers the ready sensor 193; no action is taken in response, however, because the autochanger controller 16 has already de-activated the READY indicator 196d in task 1116.

Next, in task 1120, the operator is permitted to add or remove one or more cartridges, or to remove the entire magazine and substitute a different magazine. In task 1122, the operator closes the rail 70 by returning the tab 80 to its original position. This de-activates the ready sensor 193, signalling the autochanger controller 16 that the rail 70 is closed. However, the READY indicator 196d is not illuminated yet since the locking solenoid has not been activated. In task 1124 the autochanger controller 16 activates the locking solenoid 194 to hold the rail 70 in place. Also in task 1124, the autochanger controller 16 turns off the OK indicator 196b, signifying that it is no longer okay to insert or remove the magazine or a cartridge. Furthermore, if any indicator 195a of a strip 195 has been illuminated, the autochanger controller 16 de-activates the illuminated indicator 195a in the case of a cartridge access, or deactivates all indicators in the case of a magazine access. Also in task 1124, the autochanger controller 16 illuminates the READY indicator 196d, denoting that the rail 70 is now locked into the cartridges and that the stackloader is ready for operation. Accordingly, the stackloader 20 now permits horizontal and vertical movement of cartridges, e.g. cartridge movement performed during mounting and de-mounting the cartridges. In task 1126, the routine 1100 ends, returning to the routine 1400, 1500, 1600, or 1700 that originally summoned the operator interface routine 1100.

Mode Selection Commands

As discussed above, the present invention also contemplates a number of mode selection commands, such as the following: (1) definition of the drive and media type in the stackloader, (2) setting the increments for the stackloader media, (3) setting horizontal travel for different media types, (4) setting the media storage receptacle increments in the stackloader, (5) setting the number of media receptacles in the stackloader, and (6) locating the opening of the drive with respect to the media in the magazine. An alternative to the SCSI interface with the autochanger controller is to employ a microchannel which would send SCSI commands over the microchannel interface to operate the stackloader.

OTHER EMBODIMENTS

Obviously, other embodiments and modifications of the invention will occur to those of ordinary skill in the art in view of the above teachings. Therefore, the invention is to be limited only by the following claims, which include all of such embodiments and modifications when viewed in conjunction with the above specification and accompanying drawings.

What is claimed is:

1. A pluggable stackloader for transporting media to and from a digital data storage drive contained in a computer having a computer housing having a front side with an open slot and another slot occupied by the storage drive, the stackloader comprising:

a stackloader housing;

a plug rigidly fixed to the stackloader housing, the plug being receivable by said open slot, the plug positioning the stackloader housing adjacent the front side of the computer when the plug is inserted in said open slot;

a media magazine having a plurality of receptacles for slidably supporting the media, each receptacle having an open end;

the media magazine being mounted in the stackloader housing for vertical movement to a plurality of medium processing positions, each medium processing position aligning a respective medium with the drive so that the medium can be moved horizontally into or out of the drive through the open end of the respective receptacle;

a vertical movement mechanism mounted to the stackloader housing and connected to the magazine to vertically move the magazine to selected medium processing positions;

a horizontal movement mechanism mounted to the stackloader housing and engagable with a medium which is aligned with the drive to move the medium into and out of the drive;

a controller, electrically connectable to the vertical and horizontal movement mechanisms via the plug, to manage selected operations of the stackloader; and an operator panel, coupled to the controller, including at least one indicator to provide information to a human operator, said operator panel also including at least one operator-activated switch to receive and convey operator input to the controller.

2. The stackloader of claim 1, the controller being contained within the computer.

3. The stackloader of claim 1, the controller being contained within the stackloader.

4. The stackloader of claim 1, the controller including control circuitry contained within the computer and other control circuitry being contained within the stackloader.

5. A pluggable stackloader for transporting media to and from a digital data storage drive contained in a computer having a computer housing having a front side with an open slot and another slot occupied by the storage drive, the stackloader comprising:

a stackloader housing;

a plug rigidly fixed to the stackloader housing, the plug being receivable by said open slot, the plug positioning the stackloader housing adjacent the front side of the computer when the plug is inserted in said open slot;

a media magazine having a plurality of receptacles for slidably supporting the media, each receptacle having an open end;

the media magazine being mounted in the stackloader housing for vertical movement to a plurality of medium processing positions, each medium processing position aligning a respective medium with the drive so that the medium can be moved horizontally into or out of the drive through the open end of the respective receptacle;

a vertical movement mechanism mounted to the stackloader housing and connected to the magazine to vertically move the magazine to selected medium processing positions;

a horizontal movement mechanism mounted to the stackloader housing and engagable with a medium which is aligned with the drive to move the medium into and out of the drive;

a controller, electrically connectable to the vertical and horizontal movement mechanisms via the plug, to manage selected operations of the stackloader; and indicator strip coupled to the controller and positioned proximate the stackloader housing, said indicator strip including multiple indicators selectively and individually activated by the controller, each indicator being exclusively associated with one of the receptacles by being positioned adjacent thereto.

6. The stackloader of claim 5, the controller being contained within the computer.

7. The stackloader of claim 5, the controller being contained within the stackloader.

8. The stackloader of claim 5, the controller including control circuitry contained within the computer and other control circuitry being contained within the stackloader.

9. A pluggable stackloader for transporting media to and from a digital data storage drive contained in a computer having a computer housing having a front side with an open slot and another slot occupied by the storage drive, each medium including a cartridge having a pair of spaced apart parallel edges, the edges having a pair of oppositely disposed first and second notches, the stackloader comprising:

a stackloader housing;

a plug rigidly fixed to the stackloader housing, the plug being receivable by said open slot, the plug positioning the stackloader housing adjacent the front side of the computer when the plug is inserted in said open slot;

a media magazine having a plurality of receptacles for slidably supporting the media, each receptacle having an open end, wherein each of the first notches and the second notches of a plurality of cartridges are substantially vertically aligned when the plurality of cartridges are mounted in the magazine;

the media magazine being mounted in the stackloader housing for vertical movement to a plurality of medium processing positions, each medium processing position aligning a respective medium with the drive so that the medium can be moved horizontally into or out of the drive through the open end of the respective receptacle;

a vertical movement mechanism mounted to the stackloader housing and connected to the magazine to vertically move the magazine to selected medium processing positions;

a horizontal movement mechanism mounted to the stackloader housing and engagable with a medium which is aligned with the drive to move the medium into and out of the drive;

a controller, electrically connectable to the vertical and horizontal movement mechanisms via the plug, to manage selected operations of the stackloader;

wherein the stackloader housing includes front and rear sides, the front side of the stackloader housing being adjacent the front side of the computer when the plug is inserted in the open slot, the rear side of the stackloader housing being substantially open;

a rail pivotally connected to the stackloader housing for selectively pivoting into and out of the second notches of a plurality of cartridges mounted in the magazine so as to lock and unlock respectively the cartridges in the magazine and being capable of riding in the second notches when the magazine moves vertically;

the rail having a cutout which is aligned with the drive when the plug is inserted in said open slot so that when a cartridge is aligned with the drive the cartridge is unlocked for horizontal movement by the horizontal movement mechanism; and a locking solenoid, coupled to the controller, responsive to electrical signals from the controller to selectively lock the rail into the second notches of cartridges supported in the magazine to lock the cartridges in the magazine.

10. The stackloader of claim 9, the controller being contained within the computer.

11. The stackloader of claim 9, the controller being contained within the stackloader.

12. The stackloader of claim 9, the controller including control circuitry contained within the computer and other control circuitry being contained within the stackloader.

13. A pluggable stackloader for transporting media to and from a digital data storage drive contained in a computer having a computer housing having a front side with an open slot and another slot occupied by the storage drive, each medium including a cartridge having a pair of spaced apart parallel edges, the edges having a pair of oppositely disposed first and second notches, the stackloader comprising:

a stackloader housing;

a plug rigidly fixed to the stackloader housing, the plug being receivable by said open slot, the plug positioning the stackloader housing adjacent the front side of the computer when the plug is inserted in said open slot;

a media magazine having a plurality of receptacles for slidably supporting the media, each receptacle having an open end, wherein each of the first notches and the second notches of a plurality of cartridges are substantially vertically aligned when the plurality of cartridges are mounted in the magazine;

the media magazine being mounted in the stackloader housing for vertical movement to a plurality of medium processing positions, each medium processing position aligning a respective medium with the drive so that the medium can be moved horizontally into or out of the drive through the open end of the respective receptacle;

a vertical movement mechanism mounted to the stackloader housing and connected to the magazine to vertically move the magazine to selected medium processing positions;

a horizontal movement mechanism mounted to the stackloader housing and engagable with a medium which is aligned with the drive to move the medium into and out of the drive;

a controller, electrically connectable to the vertical and horizontal movement mechanisms via the plug, to manage selected operations of the stackloader;

wherein the stackloader housing includes front and rear sides, the front side of the stackloader housing being adjacent the front side of the computer when the plug is inserted in the open slot, the rear side of the stackloader housing being substantially open;

a rail pivotally connected to the stackloader housing for selectively pivoting into and out of the second notches of a plurality of cartridges mounted in the magazine so as to lock and unlock respectively the cartridges in the magazine and being capable of riding in the second notches when the magazine moves vertically;

the rail having a cutout which is aligned with the drive when the plug is inserted in said open slot so that when a cartridge is aligned with the drive the cartridge is unlocked for horizontal movement by the horizontal movement mechanism; and a ready sensor, coupled to the controller, to detect positioning of the rail and provide a representative signal to the controller.

14. The stackloader of claim 13, the controller being contained within the computer.

15. The stackloader of claim 13, the controller being contained within the stackloader.

16. The stackloader of claim 13, the controller including control circuitry contained within the computer and other control circuitry being contained within the stackloader.

* * * * *